(12) United States Patent
Jiang et al.

(10) Patent No.: US 8,093,335 B2
(45) Date of Patent: *Jan. 10, 2012

(54) THERMOPLASTIC POLYOLEFIN IN-REACTOR BLENDS AND MOLDED ARTICLES THEREFROM

(75) Inventors: Peijun Jiang, League City, TX (US); Armenag H. Dekmezian, Austin, TX (US); Joseph Gustaaf M. Flendrig, Brussels (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/638,843

(22) Filed: Dec. 15, 2009

(65) Prior Publication Data

US 2010/0152360 A1 Jun. 17, 2010

Related U.S. Application Data

(63) Continuation-in-part of application No. 12/335,252, filed on Dec. 15, 2008.

(51) Int. Cl.
*C08F 8/00* (2006.01)
*C08L 23/00* (2006.01)
*C08L 23/04* (2006.01)

(52) U.S. Cl. ......................... 525/191; 525/240

(58) Field of Classification Search .................. 525/191, 525/240; 524/500
See application file for complete search history.

(56) References Cited

U.S. PATENT DOCUMENTS

| | | | |
|---|---|---|---|
| 4,999,403 A | 3/1991 | Datta et al. |
| 5,166,268 A | 11/1992 | Ficker |
| 5,514,761 A | 5/1996 | Etherton et al. |
| 5,962,595 A | 10/1999 | Dolle et al. |
| 6,114,457 A | 9/2000 | Markel et al. |
| 6,117,962 A | 9/2000 | Weng et al. |
| 6,147,180 A | 11/2000 | Markel et al. |
| 6,184,327 B1 | 2/2001 | Weng et al. |
| 6,197,910 B1 | 3/2001 | Weng et al. |
| 6,248,832 B1 | 6/2001 | Peacock |
| 6,284,833 B1 | 9/2001 | Ford et al. |
| 6,287,705 B1 | 9/2001 | Seta et al. |
| 6,319,998 B1 | 11/2001 | Cozewith et al. |
| 6,323,284 B1 | 11/2001 | Peacock |
| 6,342,574 B1 | 1/2002 | Weng et al. |
| 6,423,793 B1 | 7/2002 | Weng et al. |
| 6,441,111 B1 | 8/2002 | Ushioda et al. |
| 6,512,019 B1 | 1/2003 | Agarwal et al. |
| 6,555,635 B2 | 4/2003 | Markel |
| 6,635,715 B1 | 10/2003 | Datta et al. |
| 6,660,809 B1 | 12/2003 | Weng et al. |
| 6,806,316 B2 | 10/2004 | Mehta et al. |
| 7,101,936 B2 | 9/2006 | Weng et al. |
| 7,223,822 B2 | 5/2007 | Abhari et al. |
| 7,256,240 B1 | 8/2007 | Jiang |
| 7,294,681 B2 | 11/2007 | Jiang et al. |
| 7,365,136 B2 | 4/2008 | Huovinen et al. |
| 2004/0054100 A1 | 3/2004 | Debras et al. |
| 2004/0127614 A1 | 7/2004 | Jiang et al. |
| 2004/0220320 A1 | 11/2004 | Abhari et al. |
| 2004/0220336 A1 | 11/2004 | Abhari et al. |
| 2004/0249046 A1 | 12/2004 | Abhari et al. |
| 2004/0249084 A1 | 12/2004 | Stevens et al. |
| 2006/0173132 A1 | 8/2006 | Mehta et al. |
| 2006/0199873 A1 | 9/2006 | Mehta et al. |
| 2006/0211819 A1 | 9/2006 | Hoenig et al. |
| 2006/0281868 A1 | 12/2006 | Sudhin et al. |
| 2006/0293453 A1 | 12/2006 | Jiang et al. |
| 2006/0293455 A1 | 12/2006 | Jiang et al. |
| 2006/0293460 A1 | 12/2006 | Jacob et al. |
| 2006/0293461 A1 | 12/2006 | Jiang et al. |
| 2006/0293462 A1 | 12/2006 | Jacob et al. |
| 2007/0129497 A1 | 6/2007 | Jiang et al. |
| 2007/0282073 A1 | 12/2007 | Weng et al. |
| 2007/0284787 A1 | 12/2007 | Weng et al. |
| 2008/0027173 A1 | 1/2008 | Ravishankar |
| 2008/0033124 A1 | 2/2008 | Jiang et al. |
| 2010/0152382 A1* | 6/2010 | Jiang et al. ...................... 525/53 |
| 2010/0152390 A1* | 6/2010 | De Gracia et al. ............ 525/240 |

FOREIGN PATENT DOCUMENTS

| | | |
|---|---|---|
| EP | 0 206 515 | 12/1986 |
| EP | 0 366 411 | 5/1990 |
| EP | 0 749 992 | 12/1996 |
| WO | WO 03/040201 | 5/2003 |
| WO | WO 2004/060994 | 7/2004 |

OTHER PUBLICATIONS

Arriola et al., "Catalytic Production of Olefin Block Copolymers via Chain Shuttling Polymerization", Science, 2006, vol. 312, pp. 714-719. Dankova et al., "Models for Conformationally Dynamic Metallocenes, Copolymerization Behavior of the Unbridged Metallocene (1-Methyl-2-phenylindenyl)(2-phenylindenyl)zirconium Dichloride", Macromolecules, 2002, vol. 35, No. 8, pp. 2882-2891.
Lohse et al., "Graft Copolymer Compatibilizers for Blends of Polypropylene and Ethylene-Propylene Copolymers", Macromolecules, 1991, vol. 24, No. 2, pp. 561-566.

* cited by examiner

Primary Examiner — Nathan M Nutter
(74) Attorney, Agent, or Firm — Darryl M. Tyus

(57) ABSTRACT

This invention relates to a molded article comprising an in-reactor polymer blend comprising: (a) a first propylene polymer comprising 90 to 100 wt % propylene and from 0 to less than 10 wt % comonomer, said first propylene component having a Tm of 135° C. or more; and (b) a second propylene polymer comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer, wherein the polymer blend has:
    (a) a Tm of at least 135° C.,
    (b) a melt flow rate of at least 70 dg/min,
    (c) a tensile strength of at least 8 MPa,
    (d) an elongation at break of at least 200%,
    (e) a tensile strength at break of 10 MPa or more, and
    (f) a GME 60280 scratch resistance of less than 1.2 DL at a scratching load of 5 Newtons.

29 Claims, 6 Drawing Sheets

Polymer produced in Example 1 (field of view = 40×40 μm)

Polymer produced in Example 2 (field of view = 10×10 μm)

Polymer produced in Example 3 (field of view = 5×5 μm)

THERMOPLASTIC POLYOLEFIN IN-REACTOR BLENDS AND MOLDED ARTICLES THEREFROM

PRIORITY CLAIM

This application is a continuation-in-part of U.S. patent application Ser. No. 12/335,252, filed Dec. 15, 2008, now issued as U.S. Pat. No. 8,022,142, incorporated herein in its entirety.

FIELD OF THE INVENTION

This invention relates to molded articles comprising an in-reactor polymer blend comprising two propylene-containing polymers having different crystallinities.

BACKGROUND OF THE INVENTION

A major market for thermoplastic polyolefins (TPOs) is in the manufacture of automotive parts, especially exterior parts like bumper fascia and body side-molding and interior parts like instrument panels, door trim panels and side pillars. These parts, which have demanding stiffness, toughness, scratch resistance, and, in some cases, uniform surface appearance requirements, are generally made using an injection molding process. To increase efficiency and reduce costs, manufacturers have sought to decrease melt viscosity, decrease molding times, and reduce wall thickness in the molds, primarily by turning to high melt flow rate (MFR) polypropylenes (MFR greater than about 35 dg/min). However, these high MFR polypropylenes tend to be low in molecular weight, and therefore difficult to toughen, resulting in low impact strength especially at sub-ambient temperatures. To achieve a satisfactory balance of stiffness, toughness, and processability, one option is to combine a moderate MFR polypropylene, a high content of polyolefin modifier (typically ethylene-propylene rubber and/or plastomer) and a reinforcing filler. Unfortunately, this approach has limitations in terms of the maximum MFR that can be achieved while still meeting the stiffness and toughness requirements. In addition, it can lead to poor surface appearance, in terms of the appearance of flow marks (or "tiger stripes") or other surface defects.

Furthermore, the problem in the use of elastomers to improve the physical properties of TPO's is twofold. First, the compositions lose strength because of the elastomer and second, the elastomer contributes to a softer surface, which is thus more easily scratchable. Industrial and automotive applications frequently use filled polymer systems to provide desirable mechanical properties, such as stiffness or scratch/mar resistance. However, use of polymer fillers sometimes adversely affects the polymer's surface smoothness and can cause deleterious effects on the appearance of scratches or mars in the polymer systems. An example is the white color of a surface scratch often exhibited by a talc-filled polymer system. Thus, the usefulness of TPO is limited for many applications in the automotive industry and elsewhere where low temperature requirements and other physical properties such as scratch resistance and material shrinkage control require use of impact modifiers and other additives.

In the art, polyvinyl chloride is a material that has been used where softness (feel) of the finished surface and good processability are desired. This is a particular need in the automotive industry, where attractive surface properties, as well as hardness and scratch resistance of the material are desired, while the material should be quick, easy and cost-efficient to process. Polyvinyl chloride is, however, not recyclable. Therefore, there is still a need in the art to provide recyclable materials that can be used as alternatives to polyvinyl chloride for the fabrication of articles such as rubbery, thinner sheets used as skin layers over a core substrate, for use in automotive interior parts, such as instrument or door panels. Such materials should also have a good processability, i.e., should exhibit high flow under high shear conditions such as during injection molding for a quick, easy, and cost effective production. Furthermore, the finished article made from such materials should have attractive surface properties, in particular should have a soft feel, without feeling sticky (or non-sticky after heat aging), and should not exhibit any visible gloss change after heat aging. Additionally, the article should have good tear resistance, and its surface should be scratch resistant.

Even though TPO's are penetrating into the skin market, they generally suffer from poor grain retention; poor scratch/mar resistance; high cost of priming and painting; a limited processing window for calendaring and thermoforming compared to PVC; low tear strength; and/or poor drawability (important in thermoforming). The TPOs that meet the skin criteria are generally highly tailored and/or compounded, most of them coated, and therefore are not as cost-effective as one would like. However, TPO economics, expanding property profiles, good recyclability, and the potential for parts integration through injection molding continue to make them the most desirable materials to build on.

Thermoplastic vulcanizates (TPV) also hold promise, since there is a belief that cross-linked rubber particles could impart favorable grain retention and scratch resistance along with other beneficial properties. However, most of the TPVs made today contain large amounts of oil, which contribute to fogging and volatiles, and are more expensive than TPOs. Furthermore, most of TPV's have low melt flow rates and are difficult to process.

Other references of interest include: US 2006/0281868, US 2008/0027173, US 2008/0033124, WO 2003/040201, US 2004/0054100, U.S. Pat. No. 6,319,998, U.S. Pat. No. 6,284,833, U.S. Pat. No. 6,512,019, U.S. Pat. No. 7,365,136, U.S. Pat. No. 6,441,111, U.S. Pat. No. 6,806,316, U.S. Pat. No. 5,962,595, and EP-749992.

According to the present invention there is provided a polymer blend which exhibiting a unique combination of a high melt flow rate combined with high tensile strength, tear strength and elongation at break, is attractive for injection molding applications and particularly for injection molding components having a scratch resistant skin.

SUMMARY OF THE INVENTION

This invention relates to a molded article comprising an in-reactor polymer blend comprising: (a) a first propylene polymer comprising 90 to 100 wt % propylene and from 0 to less than 10 wt % comonomer, said first propylene component having a Tm of 135° C. or more; and (b) a second propylene polymer comprising from 30 to 90 wt % propylene and 70 to 10 wt % comonomer, said second propylene polymer having an Mw of 30,000 g/mol or more, and said second propylene-containing polymer having a different crystallinity (e.g. at least 5%) from the first polymer, wherein the polymer blend has:

(a) a Tm of at least 135° C.,
(b) a melt flow rate of at least 70 dg/min,
(c) a tensile strength of at least 8 MPa,
(d) an elongation at break of at least 200%,
(e) a tensile strength at break of 10 MPa or more, and (f) scratch resistance of less than 1.2 delta L, determined according to GME 60280, method A, 2007, at a scratching force (test load) of 5N.

DETAILED DESCRIPTION

Figure 1:
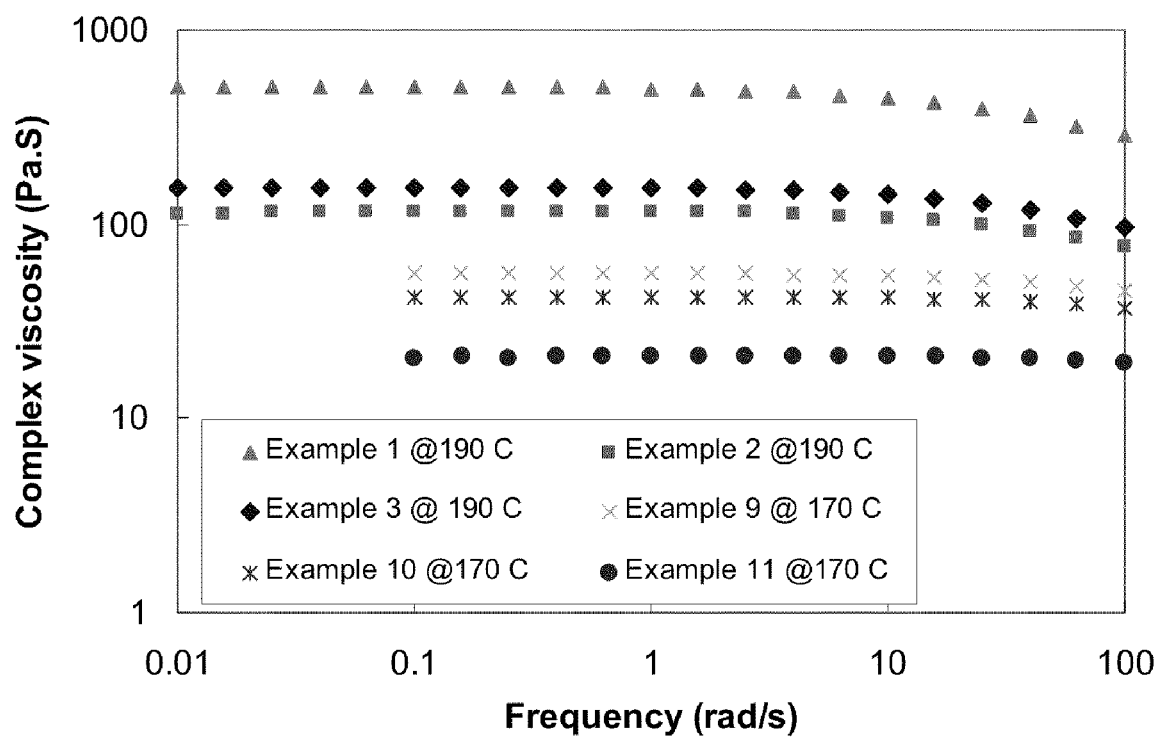
FIG. 1 is a graphic illustration of the relationship between the complex viscosity and frequency for the in-reactor polymer blends produced in Examples 1 to 3 (measured at a temperature of 190° C.) and Examples 9-11 (measured at a temperature of 170° C.).

As used herein the term "in-reactor polymer blend" is intended to mean a mixture of polymers produced in one or more polymerization zones in the same polymerization process/system without the need for post polymerization blending (although the resultant copolymer can undergo post polymerization blending, for example, to incorporate modifiers and additives). Each polymer component in the mixture possesses a unique molecular structure such as percent comonomer content, molecular weight and some of the components have molecular architectures such as branched block copolymer products.

A polymerization zone is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

For purpose of this invention a "semi-crystalline polymer" is defined to be an olefin polymer having a crystallinity of more than 5%, and an "amorphous" or "semi-amorphous polymer" is defined to be an olefin polymer having a crystallinity of 5% or less. Percent of crystallinity is calculated using heat of fusion obtained from DSC as described in the Experimental section below. Olefin polymer is defined to mean a polymer comprising carbon and hydrogen, but not heteroatoms.

Room temperature is 23° C. unless otherwise noted.

As used herein the term "branched block copolymer" is defined as the cross product obtained when a first polymer chain (also referred as macromonomer) with reactive polymerizable chain ends is incorporated into a second polymer chain during the polymerization of the latter to form a structure comprising a backbone defined by one of the polymer chains with branches of the other polymer chains extending from the backbone. Backbone and branches possess different and unique molecular structures, such as chemical composition and/or crystallinity. For example, a polypropylene homopolymer with vinyl chain ends can be incorporated into a propylene copolymer chain to form a branched cross-product with a propylene copolymer backbone and polypropylene side branches. Since the molecular structure/composition in the backbone and branches are different, the branched block composition has characteristics from both the backbone and the branches. The branched block products are also referred to as branched cross products. In one embodiment, the branches are comprised of homo-polypropylene and the backbone is comprised of propylene copolymers with at least one monomer selected from ethylene or C4 to C12 alpha olefin. In another embodiment, both the backbone and branches in the branched block polymer are comprised of propylene copolymers, wherein the difference in crystallinity between the copolymers in backbone and branches is at least 5%, preferably at least 10%, more preferably at least 20%.

To effectively incorporate a reactive polymer chain into the growing chains of another polymer, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. Vinyl terminated chains are generally more reactive than vinylene or vinylidene terminated chains. Generally, it is desirable that the first polymerization step produces a first polymer having at least 50%, such as at least 60%, for example at least 70%, even at least 80% of vinyl terminal unsaturation based on the total unsaturated olefin chain ends. Unsaturated chain ends are determined using proton NMR (collection at 120° C., 400 MHz) as described in U.S. Ser. No. 12/143,663, filed Jun. 20, 2008, particularly the procedure described on page 33 line 25 to page 34, line 11.

A propylene-containing polymer is a polymer having at least 40 wt % propylene monomer, with the balance being made up by hydrocarbon monomers, preferably ethylene and or C4 to C12 hydrocarbon monomers, preferably ethylene and or C4 to C12 alpha olefins.

Polymer Blend

In another aspect, the present invention relates to a molded article comprising an in-reactor polymer blend comprising: (a) a propylene-containing first polymer (preferably having 90 to 100 wt % propylene and a Tm of 135° C. or more); and (b) propylene-containing second polymer (preferably having 30 to 90 wt % propylene and an Mw of 30,000 g/mol or more), said second polymer having a different crystallinity from the first polymer, and wherein the polymer blend has a melting temperature, Tm, of at least 135° C. (DSC second melt), a melt flow rate of at least 70 dg/min (ASTM 1238, 230° C., 2.16 kg), a tensile strength at break of at least 8 MPa (as measured by ASTM D638 at 23° C.), an elongation at break of at least 300% (as measured by ASTM D638), and optionally, a branched block product having peaks between 44 and 45 ppm in the $^{13}$C NMR spectrum. (By the term "different crystallinity" is meant the percent crystallinities of the two polymers differ by at least 5%, preferably by at least 10%, preferably by at least 25%. Percent crystallinity is determined by DSC as described in the Experimental Section below). Preferably the in-reactor polymer blend has a scratch resistance of less than 1.2 delta L, determined according to GME 60280, method A, 2007, at a scratching force (test load) of 5N, preferably less than 1.0 delta L, alternately less than 0.5 delta L, alternately less than 0.1 delta L. Preferably the in-reactor polymer blend has a tensile strength at break of 10 MPa or more (as measured by ASTM D638 at 23° C.), preferably 15 MPa or more, preferably 20 MPa or more.

The present invention also relates to a molded article comprising the in-reactor polymer blend as described, where the blend exhibits a surface gloss change after heat aging for 168 hours at 100° C. of less than 8 (preferably less than 6, preferably 4 or less, preferably 3 or less), as determined in accordance with ISO 2813 at 60° on a K09 grained plaque. For the purposes of the present invention, a "K09 grained plaque" is a 2 mm thick plaque prepared by injection molding, using a mold which has been surface textured according to the Mold-Tech™ texture identification number MT10.039 (also referred to as MT10039) obtained from Mold-Tech, a division of Standex International Corp. (Standex Engraving Group, Windsor, Ontario, Canada), where the plaque is made with the polymer to be tested and 1 wt % carbon black.

The in-reactor polymer blend described herein has a unique combination of easy flow (high melt flow rate, e.g. 70 dg/min or more) and strong mechanical properties such as elongation and tensile strength and comprises a propylene-containing first polymer; a propylene-containing second polymer different in crystallinity from the first polymer by at least 5%, typically at least 10%; and a branched block copolymer having a backbone comprising the second polymer and branches comprising the first polymer. Preferably, the more crystalline material is employed as the first polymer and hence as the side branches of the branched block copolymer. The term "crystalline" as used herein, characterizes those polymers that possess high degrees of inter- and intra-molecular order in the solid state. Alternatively, a less crystalline material is employed as the first polymer and hence as the side branches of the branched block copolymer, characterized by a more crystalline backbone. For purposes of this invention the a branched block copolymer having a backbone comprising the second polymer and branches comprising the first polymer is identified by $^{13}C$ NMR, as described below.

The first and second polymers for the in-reactor polymer blend may each be selected from a propylene homopolymer, a semi-crystalline propylene copolymer and an amorphous thermoplastic elastomer of propylene. Any of the homopolymer, semi-crystalline propylene copolymer and amorphous elastomer can be used as either the branches or the backbone in the branched block composition.

In one embodiment, the first or the second polymer component is a propylene homopolymer. Preferably, the polypropylene is isotactic, highly isotactic, or highly syndiotactic polypropylene. As used herein, "isotactic" is defined as having at least 20% isotactic pentads, preferably having at least 40% isotactic pentads of methyl groups derived from propylene according to analysis by $^{13}C$ NMR. As used herein, "highly isotactic" is defined as having at least 60% isotactic pentads according to analysis by $^{13}C$ NMR (as described in the Experimental section below). The propylene homopolymer can be used as either the first or second polymer, or as the side branches or backbone of the branched block copolymer, but generally is used as the first polymer, namely as the side branches of the branched block copolymer.

Particularly useful propylene homopolymers have a crystallinity of at least 30%, generally at least 40% as determined by differential scanning calorimetry (DSC) as described in the Experimental Section below. Useful propylene homopolymers typically have a heat of fusion greater than 60 J/g, alternatively at least 70 J/g, alternatively at least 80 J/g, alternatively at least 90 J/g, as determined by DSC analysis as described in the Experimental Section below. Suitable propylene homopolymers typically have a melting temperature of at least 100° C., generally at least 130° C., preferably at least 140° C., even at least 150° C.

Useful propylene homopolymers normally have a weight average molecular weight of less than 200,000 g/mol, such as 150,000 g/mol or less and a MFR of 10 dg/min or greater, conveniently 50 dg/min or greater, conveniently 100 dg/min or greater, particularly 200 dg/min or greater.

In another embodiment, a semi-crystalline propylene copolymer is employed as either the first or second polymers in the polymer blend and as either the backbone or side branches in the branched block structure. The propylene copolymer is generally made with a polymerization catalyst which forms essentially or substantially isotactic propylene sequences, but which introduces stereo- and regio-errors in the incorporation of propylene in the copolymer. Stereo errors are those where the propylene inserts in the chain with a tacticity that is not isotactic. Propylene molecules are usually added head-to-tail and not tail-to-tail or head-to-head. Head-to-tail addition results in a polypropylene chain with pendant methyl groups attached to alternating carbons. This alternating arrangement is disrupted when tail-to-tail or head-to-head addition occurs. A regio error is one where the propylene inserts with the methylene group or the methine group adjacent to a similar group in the propylene inserted immediately prior to it. Such errors are more prevalent after the introduction of comonomer, such as ethylene or 1-hexene, in the semi-crystalline propylene copolymer. While not wishing to be bounded by this theory, it is believed that the introduction of these errors in the introduction of propylene, particularly in the presence of comonomer, is important in the use of these propylene copolymers as the semi-crystalline propylene copolymer. Notwithstanding the presence of these errors, the semi-crystalline propylene copolymer is statistically random in the distribution of comonomer.

Typically, the semi-crystalline propylene copolymer is made with a single site metallocene catalyst that allows only a single statistical mode of addition of propylene and comonomer in a well-mixed, continuous monomer feed stirred tank polymerization reactor and that allows only a single polymerization environment for all of the polymer chains of the semi-crystalline propylene copolymer.

Suitable semi-crystalline propylene copolymers are formed by polymerizing propylene and at least one of comonomer selected from ethylene and C4 to C12 α-olefins, such as 1-butene, 1-pentene, 1-hexene, 1-heptene, 1-octene, 1-nonene, 1-decene, 2-methyl-1-propene, 3-methyl-1-pentene, 4-methyl-1-pentene, 5-methyl-1-hexene, and mixtures thereof. Copolymers of propylene with another α-olefin, such as 1-butene, 1-pentene, 2-methylpentene, 1,3-methyl-1-butene; 1-hexene, 3-methyl-1-pentene, 4-methyl-1-pentene, 3,3-dimethyl-1-butene; methyl-1-hexene; dimethyl-1-pentene; trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene and 1-dodecene, may also be used. Copolymers of ethylene and propylene are more preferred.

Preferred semi-crystalline propylene copolymers have a peak melting temperature from 10 to 170° C., typically from 30 to 150° C.; a weight averaged molecular weight of 200,000 g/mol or less, such as 150,000 g/mol or less; and a crystallization temperature of 0° C. or higher, typically 20° C. or higher. Moderate levels (5~10%) of crystallinity are also desirable for applications where elastic properties are important. Preferred semi-crystalline propylene copolymers have more than 5% crystallinity, preferably more than 10% crystallinity. Preferred semi-crystalline propylene copolymers have a weight averaged molecular weight of 20,000 g/mol or more, such as 30,000 g/mol or more.

In another embodiment, the first or the second polymer is an amorphous thermoplastic elastomer. As used herein an amorphous polymer is defined to be an olefin polymer having a crystallinity of less than 5% as determined by DSC. Generally, the amorphous polymer is a propylene copolymer with at least one monomer selected from ethylene or C4 to C12 alpha-olefin, such as 1-butene, 1-heptene, 1-hexene, 1-octene, 1-decene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin, such as, 1-butene, 1-pentene, 2-methylpentene, 1,3-methyl-1-butene; 1-hexene, 3-methyl-1-pentene, 4-methyl-1-pentene, 3,3-dimethyl-1-butene; methyl-1-hexene; dimethyl-1-pentene; trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene and 1-dodecene, may also be used. Preferably the amorphous copolymer is the propylene/ethylene copolymer.

The amorphous nature of this component generally derives from the interruption of isotactic propylene sequences through comonomer incorporation and/or the presence of stereo- or regio-errors. The percentage of the copolymerized alpha-olefin in the amorphous copolymer is, in general, in a range of 2 wt % to 50 wt %, alternatively 5 wt % to 30 wt %. One, two or more alpha-olefins can be copolymerized with the propylene. In another embodiment, the amorphous polymer is a homopolymer such as atactic polypropylene.

Useful amorphous propylene polymers have a weight average molecular weight of 200,000 g/mol or less, such as 150,000 g/mol or less, for example 120,000 g/mol or less. Useful amorphous propylene polymers have a weight average molecular weight of 30,000 g/mol or more, such as 50,000 g/mol or more, for example 75,000 g/mol or more.

Any combination of the first and second polymer components preferably forms a population of branched block composition with a different molecular structure for the backbone from that of the side branches.

In a preferred embodiment, the blends (and molded articles) of this invention comprise: (i) a first propylene polymer comprising 90 to 100 wt % (preferably 92 to 99 wt %, preferably 95 to 97 wt %) propylene and from 0 to less than 10 wt % (alternately 1 to 8 wt %, alternately 3 to 5 wt %) comonomer (preferably ethylene, butene, hexene or octene), said first propylene component having a melting point of 135° C. or more (preferably 140° C. or more, preferably 150° C. or more); and (ii) a second propylene polymer comprising from 30 to 90 wt % (preferably 35 to 85 wt %, preferably 40 to 80 wt %) propylene and 70 to 10 wt % (preferably 65 to 15 wt %, preferably 60 to 20 wt %) comonomer (preferably ethylene, butene, hexene or octene), said second propylene polymer having an Mw of 30,000 g/mol or more, preferably 50,000 g/mol or more, preferably 75,000 g/mol or more.

In a preferred embodiment, the first propylene polymer is a propylene homopolymer or random copolymer (e.g. up to 5 wt % comonomer) having melting point of 140° C. or more and the second propylene polymer is an amorphous copolymer of propylene and from 10 to 30 wt % ethylene, butene, hexene or octene, and has an mm triad tacticity index of 50% or less, preferably 40% or less, preferably 30% or less, preferably 20% or less. The mm triad tacticity is determined from a $^{13}$C NMR spectrum of the polymer as described below and as described in U.S. Pat. No. 5,504,172. Preferred amorphous copolymers used in embodiments of the present invention may also have a propylene tacticity index (m/r) ranging from an upper limit of 1 to a lower limit of about 0.6, 0.4, or 0.3. The propylene tacticity index, expressed herein as "m/r", is determined by $^{13}$C NMR. The propylene tacticity index m/r is calculated as defined in H. N. Cheng, *Macromolecules,* 17, 1950 (1984) and as described in U.S. Pat. No. 5,504,172. The designation "m" or "r" describes the stereochemistry of pairs of contiguous propylene groups, "m" referring to meso and "r" to racemic.

The ratio of the first polymer component to the second polymer component in the reactor blend depends on the requirements of the end-use applications. The thermal properties of the final in-reactor polymer blend depend on the properties of each component and the ratio of each component in the blend. Generally, the in-reactor blend has a crystallinity of 80% or less, typically 50% or less, as calculated using heat of fusion obtained from DSC analysis. A sum of the heat of fusion from all melting peaks is used when multiple melting peaks are present. The heat of fusion for 100% crystallinity is selected from the homopolymer of the primary composition in the in-reactor polymer blend. For example, when the polymer blend is made of a propylene homopolymer and propylene/ethylene copolymer, propylene is the primary composition, and the heat of fusion of 100% crystallinity polypropylene is used (e.g. 189 J/g). In one embodiment, the in-reactor produced polymer blend has a heat of fusion between about 10 and about 70 J/g, for example between about 10 and about 60 J/g, such as between about 20 and about 50 J/g.

Conveniently, the in-reactor blend typically has a melting temperature of 135° C. or more, and generally 140° C. or more, such as 145° C. or more, for example 150° C. or more. The term "melting point," as used herein, for the in-reactor polymer blend, is the highest temperature peak among principal and secondary melting peaks as determined by DSC. In one embodiment of the present invention, the polymer has a single melting peak. Typically, a sample of in-reactor polymer blend will show secondary melting peaks adjacent to the principal peak, which peaks are considered together as a single melting peak. The highest peak temperature of these peaks is considered the melting point. The in-reactor polymer blend preferably has a melting point by DSC ranging from an upper limit of 170° C., 160° C., 140° C., 120° C., or 90° C., to a lower limit of 20° C., 3° C., 40° C., or 50° C.

Typically, the in-reactor blend has crystallization temperature of 130° C. or less. The term "peak crystallization temperature," as used herein, for the in-reactor polymer blend, is the highest temperature peak among the principal and secondary crystallization peaks as determined by DSC. In one embodiment of the present invention, the polymer has a single crystallization peak. When the crystallinity of the first and the second polymer components in the in-reactor blend is close, the polymer blend will show secondary crystallization peaks adjacent to the principal peak, which peaks are considered together as a single crystallization peak. The highest peak temperature of these peaks is considered the peak crystallization temperature. When the crystallinity of the first and the second polymer components in the in-reactor blend is far apart, the polymer blend will show two individual peaks for each component. The in-reactor polymer blend preferably has a crystallization temperature by DSC ranging from an upper limit of 120° C., 100° C., 90° C., 70° C., or 40° C., to a lower limit of 0° C., 10° C., 30° C., 40° C., or 70° C.

The melting temperatures of the polymer blend produced directly reflect the degree of crystallinity of the crystalline polymer component in the blend. The polymer blend can have a high melting temperature in a wide range of heat of fusion. In one embodiment, the polymer produced has a melting temperature of 135° C. or higher and a heat of fusion of 70 J/g or less, preferably 145° C. or higher and a heat of fusion of 60 J/g or less, more preferably 150° C. or higher and a heat of fusion of 50 J/g or less. Lower value of heat of fusion means softer materials. Alternatively, the inventive polymer blends have shore hardness from 30 A to 40 D and a melting temperature of 14° C. or higher.

Conveniently, the in-reactor blend has a weight average molecular weight of between 20,000 and 200,000 g/mol, such as between 30,000 and 150,000 g/mol with a polydispersity index (PDI=Mw/Mn) in the range of 1.5 to 40. The polydispersity index is partially determined by the catalysts and process condition employed in the polymerization process. For example, polymerization involving multiple catalysts may produce a copolymer with broader or multimodal molecular weight distribution. Multiple reactors with different polymerization conditions may produce polymer blend with multimodal molecular weight distributions. In one embodiment the polymer blend produced may have a unimodal, bimodal, or multimodal Mw/Mn. By bimodal or multimodal is meant that the Size Exclusion Chromatography (SEC) trace has more than one peak or inflection points. An inflection point is that point where the second derivative of the curve changes in sign (e.g., from negative to positive or vice versa).

The molecular weight of each component in the in-reactor blend can be optimized for a specific application. Generally, the molecular weight of the crystalline component should be greater than the entanglement molecular length, while the molecular weight of the less crystalline or amorphous component should be long enough so the crystalline component can bind the polymer segments together into a physical network in the solid state. When the molecular weight of the first polymer is low, the second polymer should have higher molecular weight to attain good mechanical strength.

The amount of the first polymer relative to the second polymer component may vary widely depending on the nature of the component polymers and intended end use of the polymer blend. In particular, however, one advantage of the present process is the ability to be able to produce a polymer blend in which the lower crystalline propylene copolymer comprises more than 20%, such as more than 50%, for example more than 70% of the total in-reactor polymer blend.

A polymer blend can be separated into fractions by solvent extraction (also referred as fractionation). A typical solvent is a saturated hydrocarbon such as hexane, cyclohexane, heptane or xylene. The extraction temperature can range from room temperature to the boiling point of the solvent. Polymers are easier to dissolve if they are pressed into a thin film and then cut into small pieces. They can also be milled into granules or powder prior to dissolving. For polymer blends containing homo-polypropylene, the polypropylene component can be separated using cyclohexane refluxing for 24 hours. The insoluble fraction comprises polypropylene and part of the branched block products. For in-reactor blends containing amorphous component, the amorphous component can be isolated by contacting the blend with cyclohexane at 25° C. for 48 hours. The soluble fraction comprises the amorphous component. Alternatively, a differential solvent fractionation of the in-reactor blend with several solvents of progressively increasing solubility and boiling point can provide several fractions. Nominally about 10 grams of the in-reactor blend is contacted with about 500 ml of cyclohexane in a thick-walled glass bottle with a screw cap closure. The sealed bottle is maintained at 25° C. for 48 hours. At the end of this period, the solution is decanted/filtered and evaporated to yield a residue of the polymer soluble to cyclohexane at 25° C. To the insoluble residue is added sufficient cyclohexane to bring the volume to about 500 ml and the bottle is then maintained at 30° C. for 48 hours. The soluble polymer is decanted/filtered and evaporated to yield a residue of the polymer soluble to cyclohexane at 30° C. In this manner, fractions of the in-reactor blends soluble at a temperature from 40° C. to 60° C. are obtained at temperature increases of approximately 5° C. between stages. Increases in temperature to over 100° C. can be accommodated if xylene, instead of cyclohexane, is used as the solvent. The temperature and temperature interval can be varied according to the distribution of the in-reactor blends.

Conveniently, the in-reactor blend has a cyclohexane refluxing insoluble fraction of 70 wt % or less, preferably 60 wt % or less. Alternatively, the in-reactor blend has a cyclohexane room temperature soluble fraction of 20 wt % or more, preferably 30 wt % or more, more preferably 40 wt % or more.

In one embodiment, the present in-reactor polymer blend has a fraction which elutes between 80 to 115° C. and a soluble fraction which elutes below 5° C. when fractionated using Temperature Rising Elution Fractionation (TREF) using the procedure described in the Experimental Section. The fraction corresponding to the highest temperature peak is referred to as the high-crystalline fraction. The soluble fraction is therefore referred to as the amorphous elastomeric component. Depending on the crystallinity of the first and second polymers as well as the branched block composition, the peak temperature may be shifted or there may be additional peaks. Alternatively, a fraction elutes at temperature between 0 and 80° C. when a semi-crystalline propylene copolymer is present in the blend.

The presence of branched block structures can be detected using nuclear magnetic resonance spectroscopy (NMR). In $^{13}$C NMR, the polymers are dissolved in tetrachloroethane-d2 at 140° C. and the spectra are collected at 125° C. The peaks corresponding to methylenes adjacent to branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For in-reactor polymer blends with low content of branched block composition, the blends should be first fractionated into components. Signals for the branched block components are found in the same fractions as the homo-polypropylene components.

Preferred in-reactor polymer blend has 0.01 branches per 1000 carbon atoms (as determined by $^{13}$C NMR) or more, preferably 0.03 or more, preferably 0.05 or more, alternately from 0.01 to 2 branches per 1000 carbon atoms.

Generally, the present in-reactor blend has a complex viscosity of 4000 Pa·s or less, preferably 3000 Pa·s or less, more preferably 2000 Pa·s or less, even more preferably 1000 Pa·s or less. The complex viscosity is measured at 190° C. over an angular frequency ranged from 0.01 to 100 rad/s using the procedure described in the Experimental Section for dynamic shear melt rheology. Most TPOs display pseudo-plastic flow behavior and their viscosity decreases with increasing shear rate (also termed shear thinning). This shear thinning behavior can be demonstrated by the decreasing complex viscosity with increasing shear rate. However, the complex viscosity of the inventive polymer blend is insensitive to the frequency over a frequency range from 0.01 to 100 rad/s (i.e., insignificant shear thinning). In one embodiment, the ratio of viscosity at a frequency of 100 rad/s to zero shear viscosity is 0.25 or greater, preferably 0.30 or greater, more preferably 0.40 or greater.

The branched block composition in the present in-reactor blend can comprise a wide variety of structural compositions that allow the tuning of tensile properties over a wide range. While not wishing to be bounded by any theory, it is believed that in addition to the branched block structural composition, the crystalline polymers form hard inclusions (or crystallites) within a soft matrix so physical crosslinks form in the polymer blend. The presence of physical crosslink promotes tensile properties. To be effective, the high crystalline hard inclusions must be multi-blocks with low crystalline or amorphous chain segments. The low crystalline or amorphous chain segments must long enough to span the distance between two hard inclusions or entangled with other chain segments from other hard inclusions.

In one embodiment, the side branch and backbone components are immiscible so that the blend has a heterogeneous morphology. One advantageous heterogeneous blend comprises the lower crystallinity polymer component in dispersed phase and the higher crystallinity polymer in the continuous phase. For some applications, the blends have a wide range in morphology as the components of greater and lesser crystallinity can also be co-continuous. Alternatively, the in-reactor blend can have a heterogeneous morphology with the higher crystalline component in a dispersed phase and the lesser crystalline component in a continuous phase. In any event, the sizes of the individual domains of the dispersed phase are very small with the smallest length dimension for the dispersed phase typically being less than 5 µm, such as less than 2 µm, even less than 1 µm without any compatibilizer added. While not wishing to be restrained by any theory, we believe that the reason for the small domain size is the presence of branched block composition which has the attributes of both the first polymer and the second polymer component. In particular, we believe that such a molecule containing segments of each of the polymeric components acts like compatibilizer in the in-reactor blend. The presence of branched block composition enables immiscible components in the blend to be compatible to the extent that no compatibilizer is needed in order to attain and retain this fine morphology. Presence of fine particles of the dispersed phase generally allows dispersion of higher amounts of the dispersed phase in a polymer matrix, stabilizes the obtained morphology by preventing coalescence of the dispersed particles, and enhances mechanical properties of the blend. This also allows the production of softer in-reactor polymer blends.

Alternatively, the components on the side branches and backbone as well as individual components in the in-reactor blend are miscible. The in-reactor produced polymer blend then has homogeneous morphology. When all the individual components are capable of crystallizing to a limited extent, they are at least partially co-crystallized.

In one practical embodiment, the present reactor blend includes a branched block copolymer in which the branches are comprised of a propylene homopolymer and the backbone is comprised of a propylene copolymer with at least one monomer selected from ethylene or C4 to C12 alpha olefin. In another embodiment, both the backbone and branches in the branched block polymer are comprised of propylene copolymers, wherein the difference in crystallinity between the copolymers in backbone and branches is at least 5%, such as at least 10%, for example at least of 20%.

The in-reactor polymer blends described herein can be produced using any appropriate polymerization techniques used in the art. Typically the in-reactor polymer blends described herein can be produced using the processes described in U.S. Ser. No. 12/335,252 filed Dec. 15, 2008, which is incorporated by reference herein. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable.

Particularly preferred transition metal compounds for producing poly-alpha-olefins useful herein are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride, rac dimethylsiladiyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl] indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372. These catalyst compounds can be activated by alumoxanes or non-coordinating anion activators such as those described at pages 30 to 34 of U.S. Ser. No. 12/335,252. Preferred activators include methyl alumoxane, modified methylalumoxane, N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis (perfluoronapthyl)borate, triphenylcarbenium tetrakis (perfluorobiphenyl)borate, triphenylcarbenium tetrakis(3,5-bis(trifluoromethyl)phenyl)borate, and triphenylcarbenium tetra(perfluorophenyl)borate.

Particularly useful catalyst/activator combinations include rac-dimethylsilyl bis(2-methyl-4-phenylindenyl) zirconium dimethyl activated with methyl alumoxane or N,N-dimethyl anilinium tetrakis (perfluoronaphthyl) borate.

Molded Articles

In a preferred embodiment, the molded article has one or more of the following properties:

1) a tensile strength (as measured by ISO 37 at 23° C.) of 8 MPa or more, such as 10 MPa or more, for example 12 MPa or more (Tensile strength is defined as the maximum stress in the stress-strain curve);
2) a tensile strength at break (as measured by ISO 37 at 23° C.) of 10 MPa or more, alternatively 12 MPa or more, alternatively 15 MPa or more;
3) an ultimate elongation (as measured by ISO 37) of 50% or more, typically 100% or more, especially 200% or more;
4) a tear strength of 30 kN/m or more, preferably 40 kN/m or more as determined in accordance with ISO 34B;
5) a melting temperature of 135° C. or higher, preferably 140° C. C or higher, more preferably 150° C. or higher; and/or
6) a Shore hardness of 15A to 90D, such as 30A to 90D (as measured by ISO 868).

Useful blends described herein and molded parts therefrom also show strain hardening in tensile strength. After the yield point, the blend and molded parts undergo a period of strain hardening, in which the stress increases again with increasing strain up to the ultimate strength in a stress-strain curve as measured according to ISO 37. Strain hardening is measured by a ratio of a stress at 300% of strain (M300) to the stress at 100% of strain (M100). The ratio of M300/M100 greater than 1 indicates strain hardening. The degree of strain hardening can also be measured using a ratio of M100 to a stress at 500% or 800% of strain. M500/M100 is defined as a ratio of the stress at 500% strain to the stress at 100% strain. Likewise, M800/M100 is defined as a ratio of the stress at 800% strain to the stress at 100% strain.

Preferred in-reactor polymer blends described herein and molded parts therefrom have a M300/M100 strain hardening ratio greater than 1.0, preferably greater than 1.02, preferably greater than 1.04; and/or a M500/M100 strain hardening ratio greater than 1, preferably greater than 1.03, preferably greater than 1.05; and/or a M800/M100 strain hardening ratio greater than 1, preferably greater than 1.1, preferably greater than 1.2. Alternatively, the in-reactor polymer blend described herein and molded parts therefrom have a strain hardening ratio Mx/M100 greater than 1.2, where Mx is the tensile strength at break.

Useful blends described herein and molded parts therefrom also have a toughness (as measured by ISO37) of 50 megajoule/m$^3$, preferably 60 megajoule/m$^3$, preferably 80 megajoule/m$^3$. Toughness is defined as the ability of polymer to absorb applied energy up to break. The area under the stress-strain curve is used as a measure of the toughness at room temperature.

In another preferred embodiment, the molded article has a unique and advantageous combination of properties including:
  (a) a tensile strength (as measured by ISO 37 at 23° C.) of 8 MPa or more;
  (b) a tensile strength at break (as measured by ISO 37 at 23° C.) of 10 MPa or more;
  (c) an ultimate elongation (as measured by ISO 37) of 50% or more, typically 100% or more, especially 200% or more;
  (d) a Shore hardness of 15A to 90D, such as 30A to 90D (as measured by ISO 868);
  (e) a tear strength of 30 kN/m or more, preferably 40 kN/m or more as determined in accordance with ISO 34B;
  (f) a melting temperature of 135° C. or higher;
  (g) a ductile failure in a multi-axial impact strength test at 230° C.; and/or
  (h) a heat distortion temperature (HDT) of 60° C. or more measured at 1.8 MPa according to ASTM D648.

Another unique feature of this invented material is a broad application temperature range. In one embodiment, the application temperature is between −40 to 160° C., preferably from −30 to 150° C., more preferably from −20 to 140° C. The in-reactor blend comprises the high crystallinity propylene copolymer component which has a melting point of greater than 140° C. and low crystallinity propylene copolymer component which has a glass transition temperature as low as −50° C. The branch-block cross products possess the characters derived from both the high and low crystallinity propylene copolymer such as low glass transition temperature from low crystallinity component and high melting temperature from high crystallinity polypropylene segments.

The molded articles of the present invention made from the compositions of the in-reactor polymer blends exhibit high scratch resistance as determined by many different industry tests. The tendency for a molded article to resist visible damage when scratched is determined on a K09 grained 2 mm injection molded plaque containing 2 wt % of carbon black master batch (Ampacet 49974).

The scratch resistance is determined based on the maximum load on a scratch finger that does not yield visible damage, as judged by a trained operator in accordance with ISO 4586-02 AMD 5 (also refer to as Taber scratch test). The probes are 1 mm diameter polished steel spheres and the scratch speed is 6000 mm/min. Loads of 1 N, 2 N, 4 N and 6 N are applied on a K09 grained 2 mm injection molded plaques. Scratch resistance is defined by a visual inspection of the scratched area. A scratch resistance of 5 N means "no visual damage on the scratched plaque at an applied force of 5 Newton or less. The molded articles of this invention have preferably a scratch resistance rating of 3 N or more, more preferably 4 N or more, even more preferably 6 N or more. In accordance with this method, the scratch resistance is rated by means of rating scores from 1 (poor) to 5 (excellent). A rating of 5 in this test means "no visible lines at any force applied"; a rating of 4 means "lines only visible at applied force of 6 N or more"; a rating of 3 means "lines only visible at applied force of 4 N or more"; a rating of 2 means "lines only visible at applied force of 2 N or more", and a rating of 1 means "lines visible at all applied forces (1 N or more)". Alternatively, ratings of at least 3.0, preferably at least 4.0 are preferred for the molded articles.

Scratch resistance is also determined according to standard GME 60280 from GM where 1 mm stylus are applied at a force of 5 to 20 Newtons (N) at a speed of 1200 mm/min. The scratch resistance of the specimen is evaluated by the change in gloss (delta L) of the surface before and after the scratching. The less the change in value of surface gloss indicates a better scratch resistance. The gloss changes before and after scratching is determined in accordance with ASTM D523 at an angle of 60° on a glossmeter, for example, a Data Color International DC3890 spectrophotometer. The molded articles of this invention have a scratch resistance (changes in surface gloss before and after scratching), delta L less than 1.2, preferably delta L less than 1.0, more preferably delta L less than 0.8 and even more preferably delta L less than 0.6 on K09 grained plaque at a scratching force of 5 Newtons.

The molded articles of the present invention exhibit reduced surface gloss change upon heat aging. In particular, in some embodiments of the present invention the surface gloss change on a K09 grained plaque after heat aging for 168 hours at 110° C. is less than 10.0, preferably less than 7.0, and even more preferably less than 5.0, as determined in accordance with ISO 2813 at an angle of 60°. In another embodiment, the surface gloss changes on a K09 grained plaque after heat aging for 168 hours at 80° C. is less than 5, preferably less than 3, and more preferably less than 2 as determined in accordance with ISO 2813 at an angle of 60°.

For the purposes of the present invention, the surface gloss change of a K09 grained plaque after heat aging is determined against a standard of highly polished black glass in accordance with ISO 2813 at an angle of 60°. The gloss of the sample before and after heat aging is measured at the identical location (spot) on the sample, under identical measurement conditions (e.g., orientation of the sample etc.). The gloss change referred to herein and in the claims is defined as the difference in gloss value measured after and before heat aging as described above. For a grained surface, the gloss of the samples should be measured from two directions and take the average of the two to compensate for potential directional differences due to surface grain pattern.

For some molded articles, the surface gloss changes with relaxation time after heat aging. The gloss rating is determined immediately after the samples are taken from the oven (while still warm) and after 1 hour of relaxation. Gloss ratings are also obtained after 24 hours of relaxation. For the purpose of this invention and claims herein, the gloss change after 1 hour relaxation is used since the value typically does not change after 1 hour of relaxation.

Gloss meter measurements conducted at 60 degree angle is not as distinctive as directly visual observation using human eyes. The grain type has a strong effect on the difference between measurement and visual rating.

For visual observation of gloss change, samples are placed on a flat surface on a laboratory bench. The bench is always in the same location in a room without outside windows to ensure the same lighting environment. At an arm length distance the observer compares the sample with the reference samples (placed directly adjacent to the test sample). If the samples are molded in the same tool the samples are always compared in the same orientation. If the samples are molded from different tools, the test sample will be rotated and rated in several directions to compensate for the grain difference. The surface gloss is rated against a set of reference samples.

In another embodiment, the heterogeneous blends of the present invention show surprisingly good blush resistance (i.e. very low to no stress-whitening). Stress-whitening, or blushing, in heterogeneous propylene copolymers is caused by the formation of voids or crazes during the deformation of a specimen, upon application of stress. Light is diffracted from the crazes and voids giving rise to the whitening, which presents an undesirable appearance. Hunter color change is used to quantify the amount of stress whitening. In essence, a molded part is impacted using a falling-weight impact tester. The impact of the weight induces stress-whitening, if the sample is susceptible. Color readings (Hunter color "L"; a measure of the black-white spectrum) are taken on the molded specimen, at the impact area and outside the impact area. The degree of stress whitening is judged as the difference between the Hunter "L" color readings of the two measurements. In other words $\Delta L$ is determined, where $\Delta L$ is defined as Hunter "L" value of impact area minus Hunter "L" value of non-impact area. In one embodiment, the heterogeneous blends of the present invention show $\Delta L$ less than 25, preferably less than 20, preferably less than 15, preferably less than 10, preferably less than 5. In another embodiment, the blends of the present invention show negative $\Delta L$ values (i.e. Hunter "L" value for impact area is less than Hunter "L" value for non-impact area).

In another embodiment, the molded articles have a surface stickiness rating of 3 or less, preferably 2 or less after heat aging at 120° C. for 168 hours. The surface stickiness is determined by a trained operator using hand to directly touch the aged surface. Samples are placed on a flat surface and are touched by hand and the stickiness is rated. The hands must be washed prior to testing (after a certain number of tests the "sensitivity" of the hand can get reduced; do not test large numbers of samples in one round). Samples tend to change their level of stickiness after they have been touched too often (do not repeat the rating too often). The elapsed time between oven aging and testing has an effect on the actual stickiness level of the samples (especially if tests are to be done while the plaques are still warm). The samples should be tested as quickly as possible right after being removed from the oven. The same level of pressure must be applied for each test. The surface stickiness is rated by means of rating scores from 1 (no sticky, excellent) to 5 (sticky, poor). A stickiness rating of 5 is comparable to tackiness of the adhesive on a post-it note. For application such as instrument panels and door trim in automobiles, a stickiness rating of 3 or better is required.

The molded articles of the present invention made from the in-reactor polymer blends also exhibit a scratch resistance (ISO 4586-02 AMD 5) rating of at least 4 and a stickiness rating of 3 or less after heat aging at 120° C. for 96 hours on a K09 grained plaque. Alternatively, the molded articles of the present invention made from the in-reactor polymer blends also exhibit a GME 60280 scratch resistance of 0.8 DL or less and a stickiness rating of 3 or less after heat aging at 120° C. for 96 hours on a K09 grained plaque.

The molded articles have shrinkage upon injection molding of 0.1 to 5% determined in accordance with ISO 2577.

The molded articles have low volatile substances. Fogging tests are used to measure the tendency for materials to volatile substances which can condense and collect on interior surfaces when in use in according to DIN 75201 B. The sample is placed at the bottom of a beaker immersed in an oil bath controlled a constant temperature of 120° C. for 16 hours. The aluminum foil is cooled at 21° C. In another embodiment, the molded articles comprising the in-reactor polymer blend has volatile constituents of less than 4 mg, preferably less than 3 mg, more preferably less than 2 mg as determined according to DIN75201B. Alternatively, the molded articles comprising the in-reactor polymer blend has a fogging number (SAE J 1756) of 80 or more, preferably 90 or more, preferably 95 or more, preferably 98 or more. According to SAE J 1756, a fixed amount of sample is subjected to a fixed temperature of 120° C. in a closed vessel such as glass beaker in an oil bath for a period of three hours. During this process, the glass plate (cooled at 21° C.) with which the container is closed acquires a deposit which changes the light reflectance of the glass plate. Fogging number is a ratio, expressed as the 60 degree reflectance value of glass plate with fogging deposits and the 60 degree reflectance of the same glass plate without fogging deposit, multiplied by 100. Fogging is minimized in the invented molded articles based on in-reactor polymer blend due to the nature of high MFR. No or little plasticizers or other flow enhancing agents are required in fabrication for high MFR materials.

In another preferred embodiment, the molded article has a unique and advantageous combination of properties including:

(a) a tensile strength (as measured by ASTM D638 at 23° C.) of 8 MPa or more, such as 10 MPa or more, for example 12 MPa or more. Tensile strength is defined as the maximum stress in the stress-strain curve; and/or (b) a tensile strength at break (as measured by ASTM D638 at 23° C.) of 10 MPa or more, alternatively 12 MPa or more, alternatively 15 MPa or more; and/or (c) an elongation at break (as measured by ASTM D638) of 200% or more, typically 300% or more, especially 400% or more; and/or (d) a Shore hardness of 15A to 90D, such as 30A to 90D (as measured by ISO 868); and/or (e) a tear strength of 30 kN/m or more, preferably 50 kN/m or more, preferably 70 kN/m or more, as determined in accordance with ISO 34B; and/or (f) a melt flow rate (ASTM D 1238 230° C., 2.16 kg) of at least 70 dg/min, (preferably at least 80 dg/min, preferably at least 100 dg/min, preferably at least 150 dg/min); and/or (g) a Tm of 135° C. or more, preferably 140° C. or more, preferably 150° C. or more, preferably 155° C. or more, preferably 160° C. or more); and/or (h) a scratch resistance of less than 1.2 delta L, determined according to GME 60280, method A, 2007, at a scratching force (test load) of 5N (preferably less than 1.0 delta L, alternately less than 0.5 delta L, alternately less than 0.1 delta L).

Additives

The in-reactor polymer blend described herein may optionally be combined with one or more additives known in the art, such as reinforcing and non-reinforcing fillers, scratch resistant agents, plasticizers, antioxidants, heat stabilizers, extender oils, lubricants, antiblocking agents, antistatic agents, anti-fogging agent, waxes, foaming agents, pigments, flame/fire retardants, dyes and colorants and ultraviolet absorber. Other additives include, for example, blowing agents, vulcanizing or curative agents, vulcanizing or curative accelerators, cure retarders, processing aids, tackifying resins, and other processing aids known in the polymer compounding art. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired. The aforementioned additives may be either added independently or incorporated into an additive or master batch. Such additives may comprise up to about 70 wt %, more preferably up to about 65 wt %, of the total composition.

Fillers and extenders which can be utilized include conventional or nanosized inorganics such as calcium carbonate, clays, silica, talc, titanium dioxide, carbon black, mica, silicate, combinations thereof, and the like. Extender oils and plasticizers may also be used. The rubber processing oils generally are paraffinic, naphthenic or aromatic oils derived from petroleum fractions.

The blends of this invention may also comprise slip agents or mold-release agents to facilitate moldability, preferably present at 50 ppm to 10 wt %, more preferably 50 to 5000 ppm, even more preferably 0.01 to 0.5 wt % (100 to 5000 ppm), even more preferably 0.1 to 0.3 wt % (1000 to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-erucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates such as zinc stearate and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents also include amides having the chemical structure $CH_3(CH_2)_7 CH=CH(CH_2)_xCONH_2$ where x is 5 to 15. Particularly preferred amides include: 1) Erucamide $CH_3(CH_2)_7 CH=CH (CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8 CONH_2$; and 3) Oleamide which may also be preferred to as N-9-octadecenyl-hexadecanamide, $CH_3(CH_2)_7CH=CH (CH_2)_7CONH_2$. In another embodiment, stearamide is also useful in this invention. Other preferred slip additives include those described in WO 2004/005601 A1.

Particularly preferred additives include scratch resistant agents such as talc, fatty acid (oleamide and erucamide), inosilicate such as wollastonite, pectolite or okenite, high MW silicones, ionomers, and others. Some of the slip agents and fillers described above can also serve as scratch resistant agents. Preferably, the scratch resistance improving additive comprises a polymer. Preferred examples for such scratch resistance improving polymers are high molecular weight silicone rubbers, such as polysiloxanes, having molecular weights of from a few hundred to several hundred thousand g/mol, with corresponding viscosities of 1 to 10 million $mm^2/s$ Polysiloxanes, especially polydimethylsiloxanes, are preferred scratch resistance improvers. The Mw's of preferred polysiloxanes are at least about 50,000 g/mol, preferably at least about 100,000 g/mol, and more preferably at least about 200,000 g/mol. The viscosities of preferred polysiloxanes are at least about 10,000 $mm^2/s$, preferably at least about 100,000 $mm^2/s$, more preferably at least about 1,000,000 $mm^2/s$. The polysiloxanes may be used as neat materials or mixed via extrusion with various thermoplastics. The ultra-high molecular weight, ultra-high viscosity polysiloxanes are typically solid, pellet form blends of a thermoplastic polymer and 25 to 50 weight % of the polysiloxane. Examples for such polysiloxane masterbatches are the commercially available products MB50 available from Dow Corning, e.g. MB50-0002 or MB50-321.

In one or more embodiments, the scratch resistance improving additive can be a functionalized polyolefin like maleic anhydride or acrylic acid grafted polypropylene or/and maleic anhydride grafted polyethylene.

In one or more embodiments, scratch resistance improving additive can also be a polyolefin-silicone copolymer (the olefin units being derived from ethylene and/or propylene) made either by grafting of silicone groups to polyolefin or by reactor copolymerization of propylene or/and ethylene with vinyl silanes.

The polymer additives can also include a nanocomposite, which is a blend of polymer with one or more organo-clays. Illustrative organo-clays can include one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides. Further, the organo-clay can be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

When present, the organo-clay is preferably included in the nanocomposite at from 0.1 to 50 wt %, based on the total weight of the nanocomposite. The stabilizing functionality may be selected from one or more of phenols, ketones, hindered amines, substituted phenols, substituted ketones, substituted hindered amines, and combinations thereof. The nanocomposite can further comprise at least one elastomeric ethylene-propylene copolymer, typically present in the nanocomposite at from 1 to 70 wt %, based on the total composition.

The additives such as fillers and oils can be introduced into the in-reactor polymer blend during the polymerization in either the first polymerization zone or the second polymerization zone. The additives can be added into the effluent from the second polymerization zone but are preferably added into the polymer blend after removal of solvent or diluent through melt blending.

In another embodiment, the blends have less than 5 wt % filler, based on the weight of the polymers and the filler.

Additional polymers can also be added into the in-reactor polymer blend. In one or more embodiments, the additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or alpha-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the homo-polypropylene, impact, and random copolymers of propylene with ethylene or the higher alpha-olefins, described above. Preferably, the homo-polypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1% to about 30% by weight of the polymer (See, for example, U.S. Pat. Nos. 6,268,438, 6,288,171, and 6,245,856). Copolymers available under the trade name VISTAMAXX™ (ExxonMobil, Houston Tex.) are specifically included. Blends or mixtures of two or more polyolefin thermoplastics such as described herein, or with other polymeric modifiers, are also suitable in accordance with this invention. These homo-polymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Use of the Molded Article

The compositions of this invention may be used in any known application involving molding or extrusion, including consumer goods, industrial goods, construction materials, packaging materials, and automotive parts. The in-reactor polymer blends described herein may be molded into desirable end use articles by any suitable means known in the art, including but not limited to, injection molding (multi-shot injection molding as well), gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. They are particularly useful for making articles by injection molding, blow molding, film blowing, extrusion, thermoforming, gas foaming, elasto-welding and compression molding techniques.

Thermoforming is a process of forming at least one pliable plastic sheet into a desired shape. An embodiment of a thermoforming sequence is described; however this should not be construed as limiting the thermoforming methods useful with the compositions of this invention. First, an extrudate film or sheet of the composition of this invention (and any other layers or materials) is placed on a shuttle rack to hold it during heating. The shuttle rack indexes into the oven which preheats the film before forming Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The molded laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed molded laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semi-crystalline polymer such as polypropylene, fast plug speeds generally provide the best material distribution in the part.

The molded laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The molded laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The molded laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection time of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the molded composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 µm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is maintained between 160° C. and 195° C., the time in the oven between 10 and 20 seconds, and the forming tool temperature, typically a male tool, between 10° C. and 71° C. The final thickness of the cooled (room temperature), molded laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the molded laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

Preferred articles made using the blends of this invention include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components such as trim parts, parts for dashboards and instrument panels, mirror housing, body panel, protective side molding, and other interior and external components associated with automobiles, trucks, boats, and other vehicles.

The disclosed molded parts may also be fabricated using a co-injection molding process, whereby an injection mold is used to form the part and/or lid and the materials are co-injected into the mold to form separate skins. Also, the part and/or lid can be fabricated using an overmolding process, whereby one of the layers is molded first and the other layers are molded over the previously molded structure. Conventional injection molding and thermal molding may also be utilized. Further, injection molding and blow molding techniques may be combined by injection molding a preform, which is transferred to a blow mold, and inflated to form an outer structure with inner structures or layers blown into the outer structure. The process can be repeated to form as many layers as desired.

Overmolding with the soft thermoplastic composition can be achieved by a two-shot or multi-shot injection molding process or co-injection molding process. Such processes are generally described in "Special Technologies for Injection Moulding of TPE", Peter Pokomy, Engel Maschinebau GmbH, TPE 2000, 6 & 7 Mar. 2000, Paper 17, Amsterdam. Soft thermoplastic elastomers overmolded onto hard thermoplastic resin substrates are also described in "New Horizons in Thermoplastic Elastomers", Stephen J. Duckworth, M. A. Hanna Engineered Materials Europe, TPE 2000, 6 & 7 Mar. 2000, Paper 5, Amsterdam. The teachings of both of these articles are incorporated herein by reference.

Soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes. The soft thermoplastic elastomer composition can also be processed by either an extrusion or an injection molding process and the formed soft sleeve can be slipped onto the solid thermoplastic or metal substrate.

In particular, the in-reactor polymer blends described herein are intended for use in producing injection molded components for automobiles, such as door panels, consoles, armrests, dashboards, seats and headliners, especially where the component includes a foamed core covered by a soft-feeling, but scratch resistant, skin. Such components can be formed by employing separate injection molding operations to produce the core and the skin or may be produced in a single injection molding operation using commercially available multi-shot injection machinery.

In certain embodiments of the present invention, the molded articles may be automotive exterior trim pieces, automotive interior trim pieces, instrument panels, bumper fascia, or door panels. The polymer compositions of the present invention are particularly suitable as soft overmolding skins (e.g. on a polypropylene substrate) in the interior of cars, such as automotive door or instrument panels etc.

In certain embodiments, the molded articles made of the compositions of the present invention are formed by thermoforming, blow molding, injection molding, compression molding or injection-compression molding.

The nature of high melt flow rate of the invented reactor polymer blends provides a number of advantages in the injection molding processes. These materials allow using multi-shot injection molding, and making thinner and bigger pieces. It is also possible to use lower injection temperature for this invented in-reactor polymer blends. In addition to the energy saving, lower injection temperature will reduce the sample cooling time and reduce the production cycle time, and make the injection process more efficient.

Preferably the molded articles have less than 5 wt % of oil or plasticizer based on the total composition due to the nature of high melt flow rate of the invented reactor polymer blends. More preferably, the molded articles have less than 3 wt % of oil or plasticizer. In an alternative embodiment, the molded articles have less than 10 wt % of additives and have more than 90 wt % of the invented polymer blend.

Conventional doors for automobiles typically include a frame, exterior skin panel, and interior trim panel. Depending on the type of vehicle and option package, automotive doors can have more than fifty to greater than one hundred individual components. Each of these components is pre-assembled and attached or otherwise hung on one of the main panels or frame, which are then assembled together to form the door which is attached to the vehicle's chassis.

A number of such components can be made from an injection moldable resin. A majority of the moldable components are injection molded separately and then assembled to the trim panel. The extra assembly of those components adds cost to the finished trim panel due to the assembly equipment, injection molding machines, and injection molding tools needed to make and assemble the separate components.

Multi-shot injection molding techniques allow two or more materials to be injection molded into a single or multiple cavity mold. A two-shot process is commonly known as "2K" and a three-shot process is commonly known as "3K." Any suitable multi-shot injection molding machine can be used, such as an Engel Victory Combi machine available from Engel Corp. Additional in-mold processing techniques can also be used to enhance and/or facilitate the integration. Illustrative in-mold processing techniques include, but are not limited to, multiple cavity tools, insert molding, movable core sections, and gas/water assist. Robotic extrusion can also be used alone or in combination with any of these processing techniques. Robotic extrusion is particularly useful for applying the sealing members into the injection mold.

In another embodiment, this invention relates to:

1. A molded article comprising an in-reactor polymer blend comprising: (a) a first propylene polymer comprising 90 to 100 wt % propylene and from 0 to less than 10 wt % comonomer, said first propylene component having a Tm of 135° C. or more; and (b) a second propylene polymer comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer, wherein the polymer blend has:

(a) a Tm of at least 135° C. (preferably 140° C. or more, preferably 150° C. or more, preferably 155° C. or more, preferably 160° C. or more), (b) a melt flow rate of at least 70 dg/min (preferably at least 80 dg/min, preferably at least 100 dg/min, preferably at least 150 dg/min), (c) a tensile strength of at least 8 MPa (preferably 10 MPa or more, preferably 12MPa or more), (d) an elongation at break of at least 200% (preferably at least 300%, preferably at least 400%), (e) a tensile strength at break of 10 MPa or more (preferably 12 MPa or more, preferably 15MPa or more), and (f) a GME 60280 scratch resistance of less than 1.2 DL (preferably less than 1.0 delta L, alternately less than 0.5 delta L, alternately less than 0.1 delta L) at a scratching load of 5 Newton.

2. The molded article of paragraph 1 wherein the molded article has a tear strength of 30 kN/m or more (preferably 50 kN/m or more, preferably 70 kN/m or more).

3. The molded article of paragraphs 1 or 2 wherein the molded article has a GME 60280 scratch resistance of less than 1.0 DL at a scratching load of 5 Newton.

4. The molded article of any of paragraphs 1 to 3 wherein the molded article has a volatile constituent of 4 mg or less as determined according to DIN 75201B.

5. The molded article of any of paragraphs 1 to 4 wherein the molded article has a strain hardening ratio M300/M100 greater than 1.0 (preferably greater than 1.02, preferably greater than 1.04).

6. The molded article of any of paragraphs 1 to 5 wherein the molded article has a strain hardening ratio M500/M100 greater than 1.0 (preferably greater than 1.03, preferably greater than 1.05).

7. The molded article of any of paragraphs 1 to 6 wherein the molded article has a strain hardening ratio Mx/M100 greater than 1.2, where Mx is the tensile strength at break.

8. The molded article of any of paragraphs 1 to 7 wherein the polymer blends has 0.01 branches or more per 1000 carbon atoms.

9. The molded article of any of paragraphs 1 to 8, where the surface gloss change on a K09 grained surface of the molded article after heat aging for 168 hours at 110° C. is less than 10.0, as determined in accordance with ISO 2813 at an angle of 60°.

10. The molded article of any of paragraphs 1 to 9 where the surface gloss change on a K09 grained plaque of the molded article after heat aging for 168 hours at 80° C. is less than 5, as determined in accordance with ISO 2813 at an angle of 60.

11. The molded article of any of paragraphs 1 to 10 wherein the first propylene containing polymer has 92 to 99 wt % propylene and 1 to 8 wt % comonomer selected from the group consisting of ethylene, butene, hexene or octene.
12. The molded article of any of paragraphs 1 to 10 wherein the second propylene containing polymer has 35 to 85 wt % propylene and 65 to 15 wt % comonomer selected from the group consisting of ethylene, butene, hexene or octene.
13. The molded article of any of paragraphs 1 to 12 wherein the first propylene containing polymer has a melting point of 140° C. or more, and the second propylene containing polymer has an Mw of 50,000 g/mol or more.
14. The molded article of any of paragraphs 1 to 13 wherein the first propylene containing polymer has a melting point of 140° C. or more, and the second propylene containing polymer has an Mw of 50,000 g/mol or more and has an mm triad tacticity index of 75% or less and an Hf of 10 to 70 J/g.
15. The molded article of any of paragraphs 1 to 14 wherein the first propylene containing polymer has a melting point of 145° C. or more, and the second propylene containing polymer has an Mw of 75,000 g/mol or more and has an mm triad tacticity index of 50% or less and an Hf of 50J/g or less.
16. The molded article of any of paragraphs 1 to 15 wherein the polymer blend has an Mw of 20,000 to 200,000 g/mol.
17. The molded article of any of paragraphs 1 to 16 wherein the polymer blend has a cyclohexane refluxing insoluble fraction of 70 wt % or less.
18. The molded article of any of paragraphs 1 to 17 wherein the molded article has less than 1 wt % of oil, and less than 1 wt % of plasticizer.
19. The molded article of any of paragraphs 1 to 18 wherein the molded article comprises 90 wt % or more of the in-reactor polymer blend and 10 wt % or less of additives.
20. The molded article of any of paragraphs 1 to 17 wherein the molded article has a one or more of the following properties:
   (i) a Shore hardness of 15A to 90D, such as 30A to 90D (as measured by ISO868); and/or
   (ii) a heat of fusion of 70 J/g or less (preferably 60 J/g or less, preferably 50 J/g or less); and/or
   (iii) an M800/M100 strain hardening ratio greater than 1 (preferably greater than 1.1, preferably greater than 1.2); and/or
   (iv) a toughness (as measured by ISO37) of 50 megajoule/m$^3$ (preferably 60 megajoule/m$^3$, preferably 80 megajoule/m$^3$); and/or
   (v) a ductile failure in a multi-axial impact strength test at 230° C.; and/or
   (vi) a heat distortion temperature of 60° C. or more measured at 1.8 MPa according to ASTM D648.
21. The molded article of any of paragraphs 1 to 20 wherein the in-reactor blend has a one or more of the following properties:
   (a) volatile constituents of less than 4 mg (preferably less than 3 mg, preferably less than 2 mg); and/or
   (b) shrinkage upon injection molding of 0.1 to 5%; and/or
   (c) a complex viscosity of 4000 Pa·s or less (preferably 3000 Pa·s or less, preferably 2000 Pa·s or less, preferably 1000 Pa·s or less).
22. An automobile part comprising the molded article of any of paragraphs 1-21.

The invention will now be more particularly described with reference to the accompanying non-limiting Examples.

EXPERIMENTAL SECTION

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, and then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

Transmission Electron Microscopy (TEM) was used to study details of the interface between the ethylene/propylene copolymer and the semi-crystalline polypropylene phases. TEM samples were prepared by staining the samples with RuO$_4$ and then cutting ~80 nm thick section in an ultra-cryomicrotome. The instrument used was FEI Tecnai G2 F20ST FEG-TEM operated at 200 kV. Images were recorded in Scanning TEM (STEM) mode using the High-Angle Annular Dark Field (HAADF) detector. Lower density and amorphous polymers take up more stain than do higher density and more crystalline components. The STEM-HAADF images are presented in inverted contrast so that areas with lower density appear bright and areas with higher density appear dark.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 cm-1 to 4000 cm-1 was recorded and the area under propylene band at ~1165 cm-1 and the area of ethylene band at ~732 cm-1 in the spectrum were calculated. The baseline integration range for the methylene rocking band is nominally from 695 cm-1 to the minimum between 745 and 775 cm-1. For the polypropylene band the baseline and integration range is nominally from 1195 to 1126 cm-1. The ethylene content in wt % was calculated according to the following equation:

$$\text{ethylene content (wt. \%)} = 72.698 - 86.495X + 13.696X^2$$

where $X = AR/(AR+1)$ and AR is the ratio of the area for the peak at ~1165 cm-1 to the area of the peak at ~732 cm-1.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors. It used three Polymer Laboratories PLgel 10 m Mixed-B columns for separation using a flow rate of 0.54 ml/min and a nominal injection volume of 300 µL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

In conducting the $^{13}$C NMR investigations, samples are prepared by adding about 0.4 g sample to approximately 3 g of a 50/50 mixture of tetrachloroethane-d2/orthodichlorobenzene in a 10 mm NMR tube. The samples are dissolved and homogenized by heating the tube and its contents to 150° C. The data are collected using a Varian Unity Plus® 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Temperature rising elution fractionation (TREF) analysis is conducted using Polymer Char TREF 200 (PolymerChar, Valencia, Spain) equipped with an infrared detector according to the method described by Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982). The polymer samples is first dissolved in 1,2 dichlorobenzene with 400 ppm of butylated hydroxy toluene (BHT) at 160° C. for about 60 minutes at a polymer concentration of 2 to 6 mg/mL. The resulting solution is then introduced into a packed column and stabilized at 140° C. for about 45 minutes. The polymer sample is then allowed to crystallize in the packed column by slowly reducing the temperature to 30 or 0° C. at a cooling rate of 1° C./min. The sample is then first eluted from the column by pumping the solvent through the column at a flow rate of 1.0 ml/min for 10 minutes at 0° C. or 30° C. A TREF chromatogram curve is then generated by eluting the crystallized polymer sample from the column by slowly increasing the temperature of the eluting solvent from 0° C. or 30° C. to 140° C. at a rate of 2° C./min and eluting solvent flow rate of 1.0 ml/min. The concentration of eluted polymer is measured using the infrared detector.

Crystallization analysis fractionation (CRYSTAF) was conducted using a CRYSTAF 200 unit commercially available from PolymerChar, Valencia, Spain. The sample is dissolved in 1,2 dichlorobenzene at 160° C. at a polymer concentration of about 0.2 to 1.0 mg/ml for about 1 hour and stabilized at 95° C. for about 45 minutes. The sampling temperatures range from 95 to 30° C. or 95 to 0° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the crystallinity distribution of each polymer components of the in-reactor polymer blends. The CRYSTAF peak temperature and area are identified by the peak analysis module included in the CRYSTAF Software. The CRYSTAF peak finding routine identifies a peak temperature as a maximum in the dw/dT curve and the area between the largest positive inflections on either side of the identified peak in the derivative curve.

Shore hardness was determined according to ISO 868.

Brookfield viscosity was measured according the ASTM D3236 using a Brookfield digital viscometer at 190° C.

Stress-strain properties for injection molded plaques, including ultimate tensile strength, ultimate elongation, and 100% modulus, were determined at room temperature according to ISO 37 using type 2 specimens cut from injection molded plaques. Stress-strain properties for in-reactor polymer blends were determined according to ASTM D638. The specimens were prepared using compression molded plaques. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Tensile strength is also called as ultimate strength. Toughness is defined as the ability of polymer to absorb applied energy before breaking. The area under the stress-strain curve is used as a measure of the toughness.

E-Modulus is determined according to TPE-0094.

Melt flow rate (MFR) was determined according to ASTM D1238 using a load of 2.16 kg and at a temperature of 230° C.

Dynamic Mechanical Thermal Analysis (DMTA) examines the behavior of viscoelastic materials according to temperature and frequency dependent behavior. The application of a small stress produces a deformation (strain) in the material. The amount of deformation resulting from the applied stress yields information concerning the moduli of the material; its stiffness and damping properties. The DMTA is a controlled stress instrument applied in a sinusoidal fashion and gives a sinusoidal response versus time. As a consequence of the applied sinusoidal stress the material responds in an elastic (stores energy) and viscous (dissipates energy) manners. DMTA separates these responses into two different moduli values: Elastic Modulus (E') and the loss modulus (E") and in a temperature sweep these moduli are measured from the glassy region, the plateau region to the terminal region. The response of viscoelastic materials is out of phase with the input signal by an angle delta ($\delta$). The tangent of this angle is equal to the ratio E"/E' and it is a valuable indicator of the relative damping ability of the material. Any peak in the tan $\delta$ corresponds to a region where the material properties are changing very rapidly; the material is undergoing a transition or relaxation such as Tg (glass transition temperature) and other relaxations. For purpose of this invention and the claims thereto, Tg is determined by DSC, unless DSC cannot determine a Tg, then DMTA shall be used.

Dynamic shear melt rheological data was measured with an Advanced Rheometrics Expansion System (ARES) using parallel plates (diameter=25 mm) at several temperatures (150, 170, 190 and 210° C.) using a pristine compression molded sample at each temperature. The measurements were made over the angular frequency ranged from 0.01-100 rad/s. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoelastic materials $0<\delta<90$.

EXAMPLES 1 TO 3

These examples demonstrate the use of a series reactors operated in the continuous stirred-tank solution process employing rac-dimethylsilyl bis(2-methyl-4-phenylindenyl) zirconium dimethyl catalyst (Catalyst A) to produce polypropylene in the first reactor and propylene/ethylene copolymer in the second reactor. The first reactor was 0.5-liter and the second reactor was 1-liter; both of them were stainless steel autoclave reactors and were equipped with a stirrer, a water-cooling/steam-heating element with a temperature controller, and a pressure controller. Solvents, monomers such as ethylene and propylene were first purified by passing through a three-column purification system. Purification columns were regenerated periodically whenever there was evidence of lower activity of polymerization.

The solvent feed to the reactors was measured by a mass-flow meter. A Pulsa feed pump controlled the solvent flow rate and increased the solvent pressure to the reactors. The compressed, liquefied propylene feed was measured by a mass flow meter and the flow was controlled by a Pulsa feed pump. The solvent, monomers were fed into a manifold first. Ethylene from in-house supply was delivered as a gas solubilized in the chilled solvent/monomer mixture in the manifold. The mixture of solvent and monomers were then chilled to about $-15°$ C. by passing through a chiller prior to feeding into the reactor through a single tube. Ethylene flow rate was metered through a Brookfield mass flow controller.

Catalyst A was preactivated with N,N-dimethyl anilinium tetrakis (heptafluoro-2-naphthyl) borate (Activator A) at a molar ratio of 1:1 in 900 ml of toluene. All catalyst solutions were kept in an inert atmosphere with <1.5 ppm water content and fed into reactors by metering pumps. Tri-n-octylaluminum (TNOA) solution was used as a scavenger.

The reactors were first cleaned by continuously pumping solvent (e.g., isohexane) and scavenger through the reactor system for at least one hour at a maximum allowed temperature (about 150° C.). After cleaning, the reactors were heated/cooled to the desired temperature using water/steam mixture flowing through the reactor jacket and controlled at a set pressure with controlled solvent flow. Monomers and catalyst solutions were then fed into the reactor. An automatic temperature control system was used to control and to maintain the reactors at set temperatures. Onset of polymerization activity was determined by observations of a viscous product and lower temperature of water-steam mixture. Once the activity was established and system reached steady state, the reactors were lined out by continuing operating the system under the established condition for a time period of at least five times of mean residence time prior to sample collection. The resulting mixture from the second reactor, containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.4 MPa-g.

Propylene, isohexane, Catalyst A solution and scavenger solution were all fed into the first reactor. The content of the first reactor flows into the second reactor. Optionally additional propylene and ethylene were fed into the second reactor. The detailed reaction conditions and polymer properties are listed in Table 1. The molecular weight reported in Table 1 was from light scattering detector.

TABLE 1

| Example # | 1 | 2 | 3 |
|---|---|---|---|
| Polymerization temperature in the 1st reactor (° C.) | 100 | 100 | 100 |
| Propylene feed rate to 1st reactor (g/min) | 14 | 14 | 14 |
| Isohexane feed rate to 1st reactor (ml/min) | 80 | 80 | 80 |
| Catalyst A feed rate to 1st reactor (mole/min) | 2.83E−08 | 5.67E−08 | 2.83E−08 |
| Polymerization temperature in 2nd reactor (° C.) | 80 | 80 | 80 |
| Propylene feed rate to 2nd reactor (g/min) | 0 | 0 | 0 |
| Ethylene feed rate to 2nd reactor (SLPM) | 2 | 2 | 0.5 |
| Catalyst A feed rate to 2nd reactor (mole/min) | 1.70E−08 | 3.40E−08 | 1.70E−08 |
| Conversion (%) | 20.96 | 96.02 | 87.57 |
| Tc (° C.) | 106.3 | 104.4 | 104.3 |
| Tm (° C.) | 154.9 | 154.6 | 153.9 |
| Tg (° C.) | −33.8 | −38.9 | −21.8 |
| Heat of fusion (J/g) of primary peak | 50.5 | 48.4 | 24.8 |
| Tm from a secondary melting peak (° C.) | | | 93.9 |
| Heat of fusion from a secondary peak (J/g) | | | 24.4 |
| Ethylene content (wt %) | 10.02 | 10.54 | 5.9 |
| Zero shear viscosity at 190° C. (Pa · s) | 508 | 117 | 153 |
| MFR (dg/min) | 76.2 | 354.8 | 247.4 |
| Mn_LS (kg/mol) | 54.5 | 39.2 | 47.9 |
| Mw_LS (kg/mol) | 109.8 | 103.4 | 108.3 |
| Mz_LS (kg/mol) | 182.8 | 205.7 | 198.7 |
| Tensile strength (MPa) | 15.27 | 16.28 | 29.08 |
| Stress @ break (MPa) | 15.15 | 16.28 | 29.08 |
| Elongation at break (%) | 668.8 | 936.2 | 918.7 |
| Modulus at 100% of strain (MPa) | 11.0 | 10.19 | 15.04 |
| Stress at 300% of strain (MPa) | 11.41 | 10.68 | 15.75 |
| Stress at 500% of strain (MPa) | 12.88 | 11.66 | 16.46 |
| Stress at 800% of strain (MPa) | 17.32 | 15.57 | 24.69 |
| Toughness (mega joule/m$^3$) | 181.04 | 115.66 | 174.21 |

The complex viscosity of the in-reactor polymer blends produced in Examples 1 to 3 was measured at temperatures of 170 and 190° C. over a frequency ranging from 0.01 to 100 rad/s. The shear thinning measured by the complex viscosity is insignificant when the angular frequency varied from 0.01 to 100 rad/s. The ratio of complex viscosity at a frequency of 100 rad/s to the zero shear viscosity is 0.56 and 0.65 for materials produced in Example 1 and 2, respectively. The complex viscosity profiles are shown in FIG. 1.

The polymer blends produced in Examples 1 and 2 were analyzed for branch block structure using $^{13}$C NMR. Both samples had small peaks between 44 and 45 ppm. All three of the peaks identified by Weng, Hu, Dekmezian, and Ruff (Macromolecules 2002, 35, 3838-3845) for long chain branches in isotactic polypropylene were observed at 44.0, 44.7, and 44.8, but were slightly broader than in this reference because of the presence of some ethylene monomers in these samples. The areas of these three peaks were compared with the total area under the spectra to give 0.030 branches per 1000 carbons for Example 1 and 0.058 branches per 1000 carbons for Example 2. These levels of branching are similar to the levels reported by Weng, Hu, Dekmezian, and Ruff for long chain branched iPP (0.072-0.296 per 1000 carbons). There could also be additional carbons near branches resonating at different frequencies in the NMR spectra, which are either unassigned or obscured by other peaks. These long chain branches per 1000 carbons values should be viewed as the minimal amounts present in these Examples.

Figure 2:
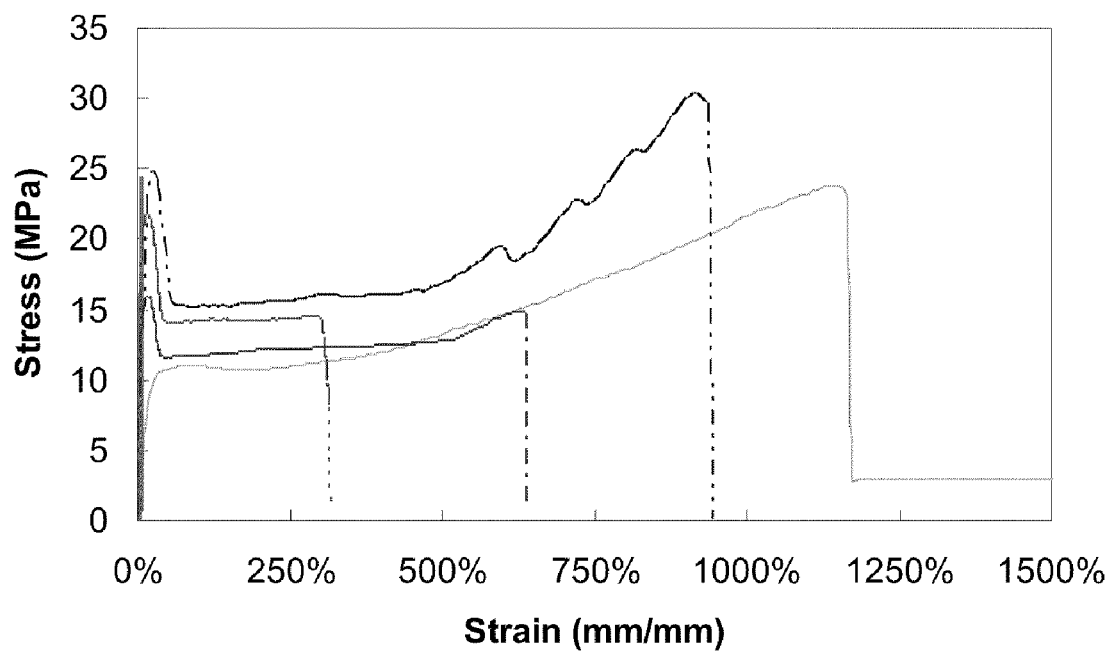
FIG. 2 shows stress-strain curves for the in-reactor polymer blends produced in Examples 1, 3 and 10 as well as for the physical blends PP2/EP1 and PP2/EP2 in Comparative Examples 13 to 16.

The polymer blends produced in the Examples 1 to 3 were compressed into plaques for the tensile testing according to the procedure described above. The strain-stress properties of the products are listed in Table 1. The tensile strength of the inventive material is comparable to that of low MFR impact copolymer even though the MFR of the present material is very high. The unusual long elongation at break for such high MFR material was also observed. The strain-stress curves for Examples 1 and 3 are shown in FIG. 2. Strain hardening is observed after the yield point. The inventive polymer blends have much longer elongation as compared to that of physically blended material of similar composition (See comparative examples below).

Figure 3:
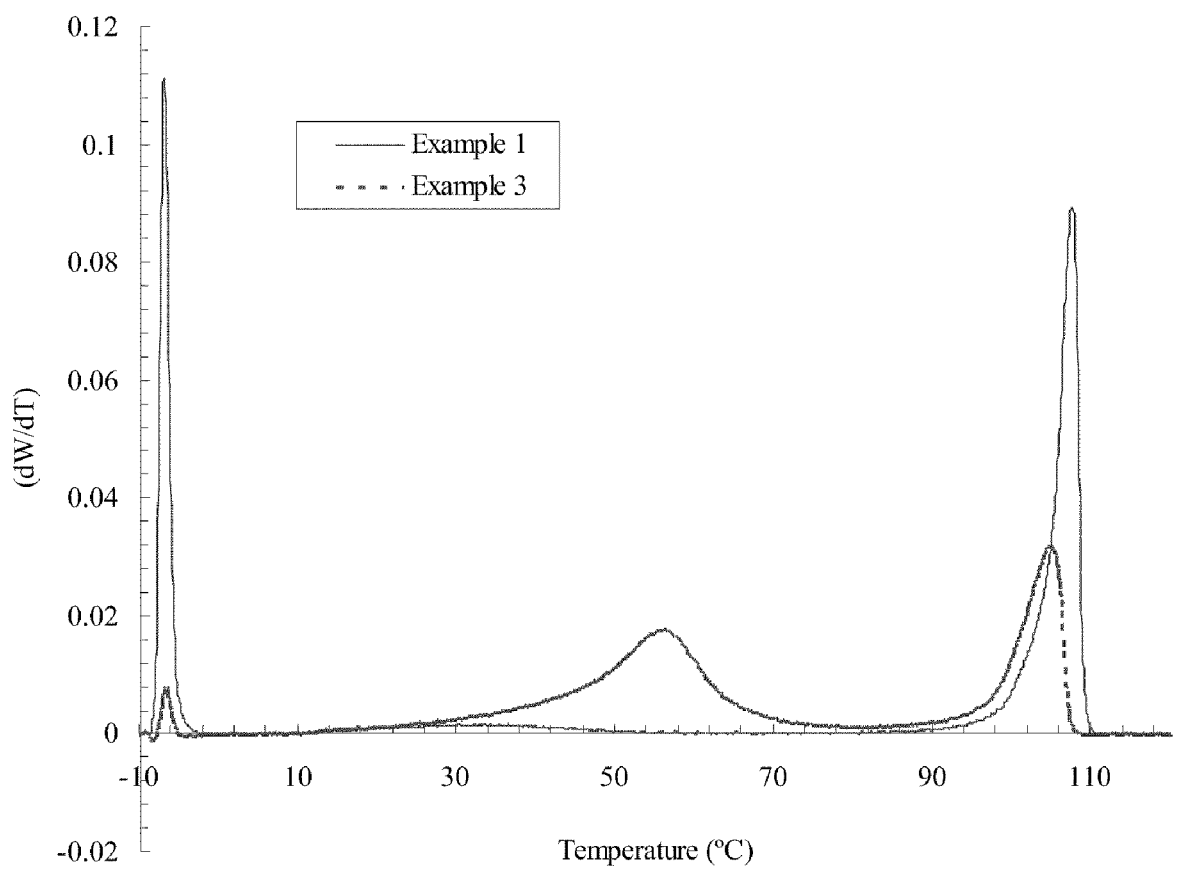
FIG. 3 show TREF traces of dw/dt against elution temperature for the in-reactor polymer blends produced in Examples 1 and 3.

Materials produced in Examples 1 and 2 have a faction eluted between 80 to 115° C. and a soluble fraction which elutes below 5° C. when fractionated using TREF according to the procedure described above. The fraction corresponding to the highest temperature peak is referred to as the high-crystalline fraction. The soluble fraction is therefore referred to as amorphous elastomeric component. Material in Example 3 showed three peaks in the TREF trace of dw/dT vs. elution temperature. The first fraction eluted between 80 and 115° C., the second fraction eluted between 0 and 80° C., and a soluble fraction eluted at below 0° C. The fraction eluted between 0 and 80° C. is partially due to the presence of semi-crystalline propylene copolymer in the blend and might be shifted depending on the crystallinity of propylene copolymer. TREF traces of dw/dT vs. elution temperature for material produced in Examples 1 and 3 are shown in FIG. 3.

The data obtained from DSC for material in Example 1 to 3 are listed in Table 1. For the material produced in Example 3, there is a secondary melting peak in addition to the primary melting peak derived from polypropylene produced in the first reactor.

Figure 6:
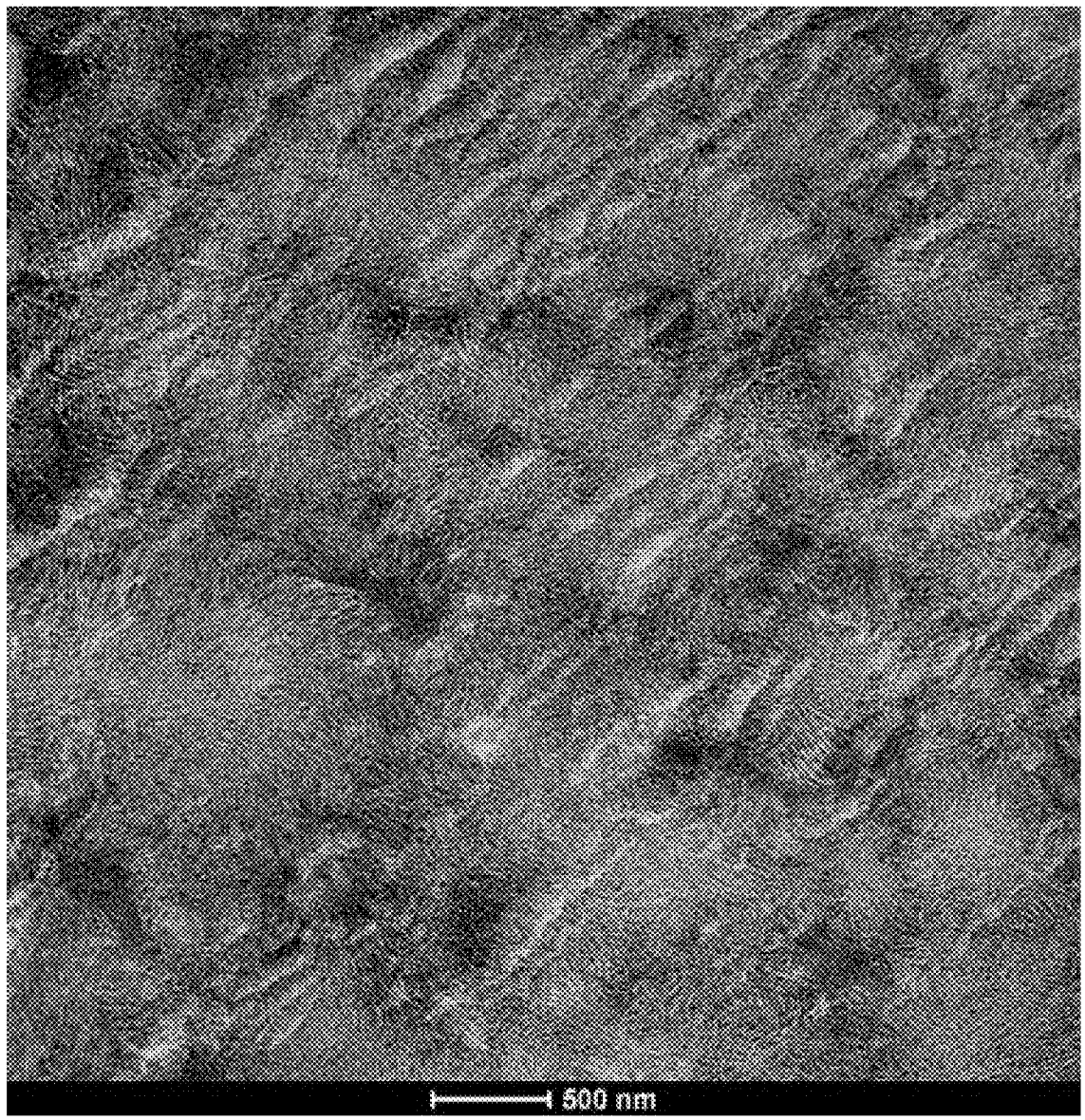
FIG. 6 is a TEM image of in-reactor polymer blend produced in Example 2 showing spherulitic lamellar microstructures in the high crystalline domain and the inter-penetrating lamellar structures across between the high crystalline and low crystalline domains.

A TEM image of the in-reactor blend made in Example 2 is shown in FIG. 6. Spherulitic lamellar microstructures were observed in the high crystalline domain (darker phase). Lamellar microstructures are also visible in the lower crystalline domain (brighter phase). In some areas there are stacks of lamellae crossing domain boundaries. In another word, the lamellar microstructures in higher crystalline domain are penetrating into the lower crystalline domain. There are no defined boundaries between domains.

Figure 4:
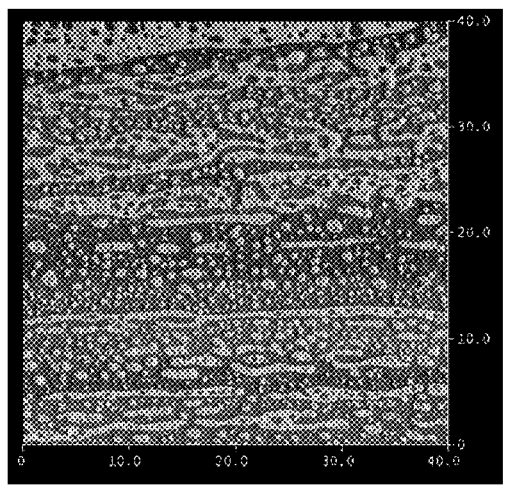
FIGS. 4(*a*) to (*c*) show atomic force micrographs (AFM) of the polymer blends produced in Example 1 (field of view=40×40 μm), Example 2 (field of view=10×10 μm) and Example 3 (field of view=5×5 μm), respectively.
Figure 4:
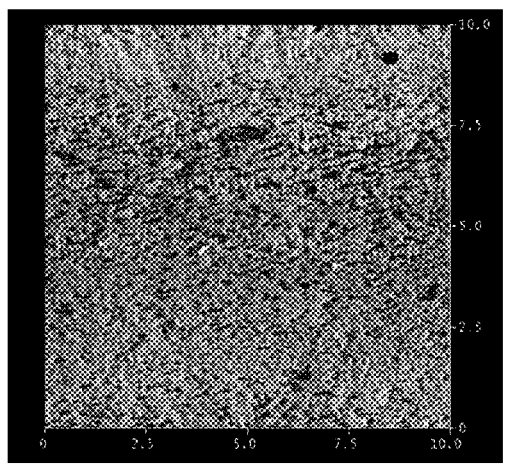
Figure 4:
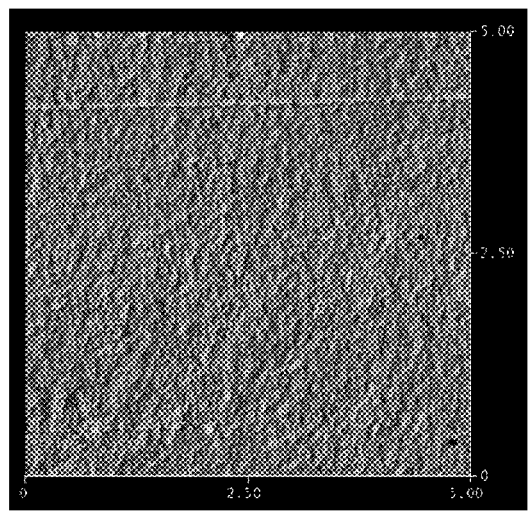
Figure 5:
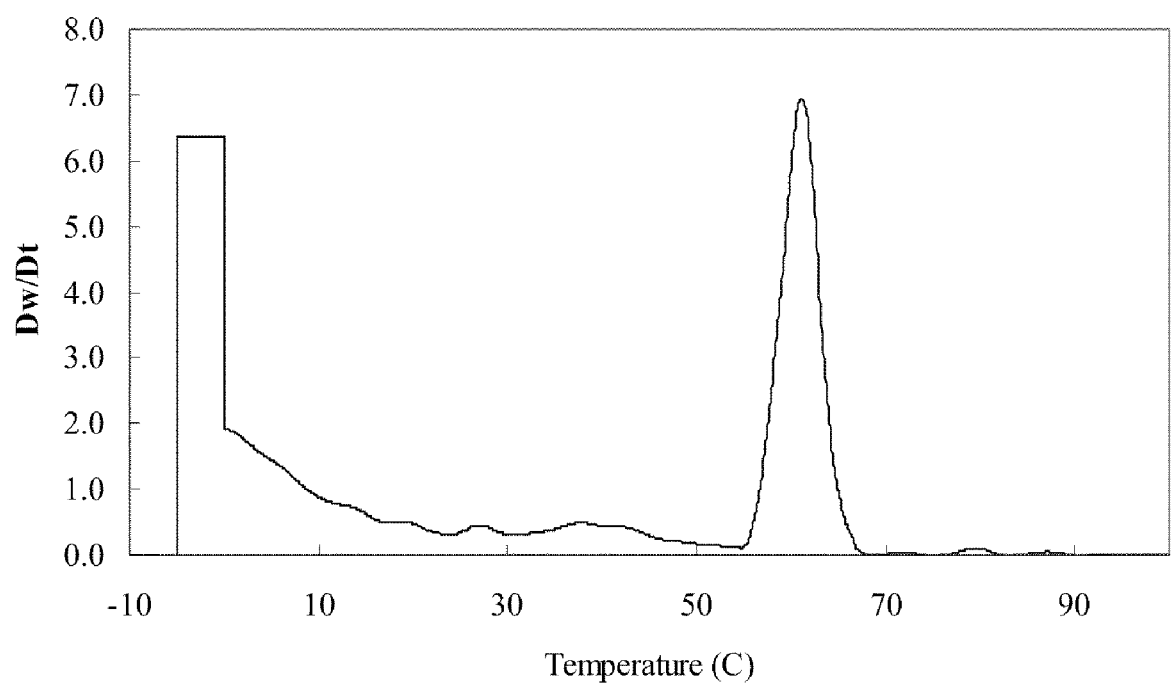
FIG. 5 is a crystallization analysis fractionation (CRYSTAF) trace for the in-reactor polymer blend produced in Example 10.

The morphology of each of the blends produced in Examples 1 to 3 was examined using AFM according to the procedure described above and the results are shown in FIG. 4. A heterogeneous morphology was observed for materials produced in the Examples 1 and 2. Most particles of the dispersed phase are less than 3 μm. A homogeneous morphology was observed for material produced in Example 3 since the propylene/ethylene copolymer is compatible with the homo-polypropylene in the in-reactor blend.

Particle size is a good indication of degree of intimate mixing of immiscible polymer blends. Small particle size implies large interfacial contact area between the dissimilar polymers. Evidence of an intimate mixing can be determined by a morphological examination of the polymer blend and is also apparent in the evaluation of the mechanical properties of the mixture. Highly dispersed polymer blends give benefits in impact strength, toughness, and the depression in the ductile to brittle transition temperature of the blends. Another novel feature of the present material is the high degree of intimated mixing between the first and the second polymer components. The intimate mixing is achieved without aid of any compatibilizer.

EXAMPLES 4 TO 8

Polymer blends in Example 4-8 were produced by following the same procedure as those used for Examples 1-3, including that the catalyst was catalyst A and the activator was Activator A. The detailed polymerization conditions and some analytical data are listed in Table 2.

TABLE 2

| Example # | 4 | 5 | 6 | 7 | 8 |
|---|---|---|---|---|---|
| Polymerization temperature in the 1$^{st}$ reactor (° C.) | 100 | 100 | 100 | 90 | 90 |
| Catalyst A feed rate to the 1st reactor (mole/min) | 5.7E−08 | 5.7E−08 | 3.3E−08 | 2E−08 | 3.3E−08 |
| Propylene feed rate to the 1st reactor (g/min) | 14 | 14 | 14 | 14 | 14 |
| Isohexane feed rate to 1st reactor (ml/min) | 80 | 80 | 80 | 80 | 80 |
| Polymerization temperature in 2nd reactor (° C.) | 80 | 80 | 80 | 80 | 80 |
| Ethylene feed rate to 2nd reactor (SLPM) | 2 | 1 | 0.5 | 0.5 | 2 |
| Conversion (%) | 91.4 | 98.4 | 92.5 | 92.7 | 96.9 |
| Tc (° C.) | 105.4 | 108.6 | 106.8 | 99.0 | 103.6 |
| Tm (° C.) | 154.8 | 154.5 | 154.4 | 155.0 | 156.4 |
| Heat of fusion (J/g) of primary peak | 36.9 | 63.3 | 68.3 | 83.6 | 36.0 |
| Tg (° C.) | −30.5 | | | −16.2 | −31.8 |
| Tm from a secondary melting peak (° C.) | | | | 110.6 | |
| Ethylene content (wt %) | 9.33 | 6.54 | 4.9 | 4.27 | 10.26 |
| Zero shear viscosity at 170° C. (Pa · s) | 125 | 170 | 142 | 732 | 373 |
| Mn_LS (kg/mol) | 40.6 | 43.0 | 47.1 | 63.1 | 43.0 |
| Mw_LS (kg/mol) | 91.4 | 112.3 | 117.9 | 143.2 | 116.0 |
| Mz_LS (kg/mol) | 172.6 | 222.5 | 240.4 | 274.2 | 275.8 |
| MFR (dg/min) | 523.7 | 454.0 | 429.0 | 134.9 | 274.7 |
| Tensile strength (MPa) | 11.0 | | 24.8 | 30.4 | 14.3 |
| Stress @ break (MPa) | 11.0 | | 15.6 | 30.4 | 14.3 |
| Elongation at break (%) | 395.8 | | 168.8 | 739.8 | 701.6 |
| Modulus at 100% of strain (MPa) | 8.52 | | 16.32 | 16.0 | 8.9 |
| Stress at 300% of strain (MPa) | 8.87 | | | 17.21 | 10.04 |
| Stress at 500% of strain (MPa) | 9.93 | | | 19.85 | 12.2 |
| Toughness (mega joule/m$^3$) | 47.84 | | 30.52 | 145.77 | 77.82 |

The complex viscosity of the in-reactor polymer blends produced in Examples 4 to 8 was measured at a temperature of 170° C. over a frequency ranging from 0.01 to 100 rad/s. The shear thinning measured by the complex viscosity is insignificant when the angular frequency varied from 0.01 to 100 rad/s. The ratio of complex viscosity at a frequency of 100 rad/s to the zero shear viscosity is 0.68 and 0.32 for materials produced in Example 4 and 7, respectively.

The polymer blends produced in the Examples 4 to 8 were compressed into plaques for the tensile testing according to the procedure described above. The strain-stress properties of the products are listed in Table 2. The tensile strength of the inventive material is comparable to that of low MFR ICP even though the MFR of the present material is very high. The unusual long elongation at break for such high MFR material was also observed. The inventive polymer blends have much longer elongation as compared to that of physically blended material of similar composition (See comparative examples below).

Materials produced in Examples 4 have a faction eluted between 50 to 80° C. and a soluble fraction which elutes below 10° C. when fractionated using CRYSTAF according to the procedure described above. The fraction corresponding to the highest temperature peak is referred to as the high-crystalline fraction. The soluble fraction is therefore referred to as amorphous/low crystalline elastomeric component. Material in Example 7 showed three peaks in the CRYSTAF trace of dw/dT vs. elution temperature. The first fraction eluted between 60 and 80° C. with a peak at around 68° C., the second fraction eluted between 30 and 60° C. with a peak at around 43° C., and a soluble fraction eluted at below 10° C. The fraction eluted between 30 and 60° C. is partially due to the presence of semi-crystalline propylene copolymer in the blend and might be shifted depending on the crystallinity of propylene copolymer.

The data obtained from DSC for material in Example 4~8 are listed in Table 2. For the material produced in Example 7, there is a secondary melting peak in addition to the primary melting peak derived from polypropylene produced in the first reactor.

The in-reactor blends produced in Examples 4-8 were compounded with 0.3 wt % of Irganox B225 (available from Ciba Corporation, Tarrytown, N.Y.) and 2 wt % of Ampacet 49974 black slip PP master batch color agent (Ampacet, Tarrytown, N.Y.). The compounded materials were injection molded to produce the ISO plaques of 150 mm length, 100 mm width and 2 mm thickness with both smooth surface and grained surface for further testing. The grain pattern used was K09 as defined above.

The grained surface plaques were used for scratch resistance, stickiness and gloss change tests. The black color provides adequate visible contrast for scratch visibility investigation. Smooth surface plaques were used for strain-stress tensile tests.

Fogging was determined using a Haake fogging tester (available from Thermo Scientific Inc.) in according to DIN 75201B. The sample was placed at the bottom of a beaker immersed in an oil bath controlled a constant temperature of 120° C. for 16 hours. The aluminum foil was cooled at 21° C. The results for all injection molded samples using polymer blends produced in Examples 4 to 8 are listed in Table 3.

The gloss values for heat aged samples measured immediately after heat aging are listed in Table 6. The gloss values for heat aged samples measured after 1 hour of relaxation are listed in Table 7. The gloss values were determined in accordance with ISO 2813 at an angle of 60° on a K09 grained surface of molded articles using Super 3 Gloss tester from Braive Instruments, Belgium. The molded articles were heat aged at various temperatures and heating times. The gloss values of samples were measured from two directions (about 22.5° apart) at the same spot and averaged to compensate for potential directional differences in the grained surface. The gloss of the sample before and after heat aging was measured at the identical location (spot) on the sample, under identical measurement conditions (e.g., orientation of the sample etc.). The values reported in Tables 6 and 7 were average values of three measurements of specular gloss at a same spot. The gloss change referred to herein and in the claims was defined as the difference in gloss values measured after and before heat aging as described above. The gloss changes after aging for these samples are listed in Table 3. These samples were also visually rated for gloss changes after heat aging.

Scratch resistance was determined according to GME 60280, method A with a load of 5 Newton using Erchisen Scratch Hardness Tester Model 430 P-1 available from ERICHSEN GmbH & Co. KG, Germany. The scratch resistance was evaluated through gloss changes before and after scratching, and defined as the gloss value after scratch minus the gloss value before scratch (delta L), and the results are listed in Table 3.

TABLE 3

Performance data of molded articles using the in-reactor polymer blends produced in Examples 4~8

| Example # | Sk#1 | Sk#2 | Sk#3 | Sk#4 | Sk#5 |
|---|---|---|---|---|---|
| Polymer #1 | 4 | 5 | 6 | 7 | 8 |
| Neat polymer (wt %) | 97.7 | 97.7 | 97.7 | 97.7 | 97.7 |
| Irganox B225 (wt %) | 0.3 | 0.3 | 0.3 | 0.3 | 0.3 |
| Carbon MB (wt %) | 2 | 2 | 2 | 2 | 2 |
| Shore hardness | 39D | 52D | 58D | 60D | 39D |
| Scratch resistance at 5N (delta L) | 0.41 | 0.62 | 0.83 | 0.68 | 0.34 |
| Fogging @ 120° C. (mg) | 0.32 | 0.24 | 0.12 | 0.12 | 0.03 |
| Tensile strength (MPa) | 10 | 17.6 | 23.4 | 27.2 | 10.5 |
| Elongation at break (%) | 711 | 147 | 90 | 112 | 751 |
| Modulus at 100% of strain (MPa) | 8.6 | 11.9 | 11.6 | 14.6 | 9.1 |
| E-modulus (MPa) | 106 | 254 | 413 | 493 | 104 |
| Tear strength (kN/m) | 62 | 55 | 40 | 58 | 63 |
| Gloss change after aging at 80° C. for 788 hours (measured after 1 hour of relaxation) | 4.6 | 3.35 | −0.05 | 0 | 5.25 |
| Gloss change after aging at 100° C. for 620 hours (measured after 1 hour of relaxation) | 10.65 | 7.75 | 0.8 | 0.1 | 13.15 |

EXAMPLES 9 TO 12

In Examples 9, 10 and 11, low crystalline propylene/ethylene copolymer was produced in a first reactor, and higher crystalline propylene/ethylene copolymer was produced in a second reactor. The polymerization catalyst, activator and procedure were the same as that used in Examples 1-3 except that ethylene was fed into the first reactor and additional propylene was fed into the second reactor. The crystallinity of the polymer produced in the second reactor was controlled through adjustment of ethylene conversion in the first reactor and addition of propylene into the second reactor. In Example 11, 1,9-decadiene was also added into the first reactor. Presence of 1,9-decadiene makes branched propylene/ethylene copolymers and enhances the vinyl chain population of the polymers produced in the first reactor and branched block product population in the subsequent polymerization in the second reactor. Example 12 was produced following the same procedure as those used for Examples 1-3 except that 1-hexene instead of ethylene was used as a comonomer; the first reactor was 1 liter and the second reactor was 0.5 liter. Additional catalyst was also fed into the second reactor. The polymer produced in the second reactor was predominately propylene/hexene copolymer. Detailed conditions and some characterization data are listed in Table 4. The molecular weights listed in Table 4 were obtained from a light scattering detector.

TABLE 4

| Example # | 9 | 10 | 11 | 12 |
|---|---|---|---|---|
| Polymerization temperature in 1st reactor (° C.) | 80 | 70 | 80 | 90 |
| Catalyst A feed rate to 1st reactor (mole/min) | 8.50E−08 | 8.50E−08 | 8.50E−08 | 1.89E−08 |
| Ethylene feed rate to 1st reactor (SLPM) | 2 | 2 | 2 | 0 |
| Propylene feed rate to 1st reactor (g/min) | 14 | 14 | 14 | 14 |
| 1,9 decadiene feed rate to 1st reactor (ml/min) | 0 | 0 | 0.049 | 0 |
| Isohexane feed rate to 1st reactor (ml/min) | 80 | 80 | 80 | 120 |
| Polymerization temperature in 2nd reactor (° C.) | 100 | 100 | 100 | 80 |
| Catalyst A feed rate to 2nd reactor (mole/min) | 3.23E−08 | 0 | 0 | 7.56E−08 |
| Propylene feed rate to 2nd reactor (g/min) | 10.2 | 10.2 | 10.2 | 0 |
| 1-hexene feed rate to 2nd reactor (ml/min) | 0 | 0 | 0 | 6 |
| Conversion (%) | 99.0 | 95.6 | 88.4 | 36.4 |
| Tc (° C.) | 102.3 | 100.4 | 103.9 | 106.2 |
| Tm (° C.) | 147.3 | 145.1 | 140.2 | 157.9 |
| Heat of fusion (J/g) of the primary peak | 38.7 | 34.8 | 35.0 | 71.9 |
| Tg (° C.) | −25.6 | −27.8 | −28.3 | |
| Tc from a secondary cooling peak (° C.) | 54.3 | 49.1 | 49.0 | |
| Tm from a secondary melting peak (° C.) | 73.6 | 69.6 | 69.8 | |
| Heat of fusion2 (J/g) | 6.6 | 8.2 | 10.2 | |
| Ethylene content (wt %) | 5.9 | 7.1 | 7.6 | 0 |
| 1-hexene content (wt %) | 0 | 0 | 0 | 4.7 |
| Zero shear viscosity at 170° C. (Pa · s) | 56.1 | 42.2 | 19.2 | |
| Mn_LS (kg/mol) | 35.29 | 41.98 | 33.10 | 98.48 |
| Mw_LS (kg/mol) | 91.67 | 83.12 | 68.59 | 170.68 |
| Mz_LS (kg/mol) | 188.30 | 150.60 | 139.06 | 263.44 |
| MFR (dg/min) | 680.46 | 689 | 503.6 | |
| Tensile strength (MPa) | 18.1 | 16.1 | 14.0 | |
| Stress @ break (MPa) | 13.8 | 14.4 | 11.8 | |
| Elongation at break (%) | 548.1 | 652.9 | 557.9 | |
| Modulus at 100% of strain (MPa) | 12.6 | 11.6 | 10.3 | |
| Stress at 300% of Strain (MPa) | 12.89 | 11.84 | 10.87 | |
| Stress at 500% of Strain (MPa) | 13.34 | 12.28 | 11.5 | |
| Toughness (meg joule/m³) | 62.38 | 81.45 | 62.04 | |

The complex viscosity of the in-reactor polymer blends produced in Examples 9 to 11 was measured at a temperature of 170° C. over a frequency ranging from 0.01 to 100 rad/s. The shear thinning measured by the complex viscosity is insignificant when the angular frequency varied from 0.01 to 100 rad/s. The ratio of complex viscosity at a frequency of 100 rad/s to the zero shear viscosity is 0.81 and 0.91 for materials produced in Example 9 and 11, respectively.

The polymer blends produced in the Examples 9 to 12 were compressed into plaques for the tensile testing according to the procedure described above. The strain-stress properties of the products are listed in Table 4. The tensile strength of the inventive material is comparable to that of low MFR impact copolymer even though the MFR of the present material is very high. The unusual long elongation at break for such high MFR material was also observed. The inventive polymer blends have much longer elongation as compared to that of physical blended material of similar composition (See comparative examples below).

The material produced in Example 10 has a faction eluted between 53 to 70° C. with a peak temperature of about 60° C. and another fraction which elutes below 30° C. when fractionated using CRYSTAF according to the procedure described above. The fraction corresponding to the highest temperature peak is referred to as the high-crystalline propylene copolymer fraction. The lower temperature fraction is much broader than that for polymers made in Example 1 to 8.

In addition to a primary melting and a primary crystallization peak, the in-reactor polymer blends produced in Examples 9 to 11 show a secondary melting peak and a secondary crystallization peak in the DSC traces.

Figure 7:
FIG. 7 is a TEM image of in-reactor polymer blend produced in Example 11 showing lamellar microstructure in both domains with some lamellae crossing the interface boundaries.

A TEM image of the in-reactor blend made in Example 11 is shown in FIG. 7. Lamellar microstructures were observed in both the high crystalline domain (darker phase) and lower crystalline domain (brighter phase). In some areas there are stack of lamellae cross the domain boundaries. In another word, the lamellar microstructures in higher crystalline domain are penetrating into the lower crystalline domain. There are no defined boundaries between domains.

The in-reactor blends produced in Examples 9-12 were compounded with 0.3 wt % of Irganox B225 and 2 wt % of Ampacet 49974 black slip PP master batch. The compounded materials were injection molded into plaques with both smooth surface and grained surface for further testing. The grain used was K09 (Volkswagen leather imitation grain).

The scratch resistance test and surface gloss change test were conducted on the grained surface. Scratch resistance was determined according to GME 60280, Method A using a 5-Newton load (as described above). The scratch resistance for injection molded plaque using polymer blend produced in Example 12 (Sk#9) was also tested using a procedure according to ISO 4586-2 AMD 5 (Taber scratch test).

The gloss changes after heat aging were determined in accordance with ISO 2813 at an angle of 60° using Super 3 gloss tester from Braive Instruments, Belgium and data are listed in Table 5. The gloss values for these samples at various aging temperatures and aging durations are listed in Table 6 and Table 7. As the samples have a grained surface, the gloss was measured in two directions to compensate for any orientation in the grain. The two directions were about 22.5 degree apart rotated around the measuring spot.

Fogging test was determined using Haake fogging tester (available from Thermo Scientific Inc.) in according to DIN 75201B. The sample was placed at the bottom of a beaker immersed in an oil bath controlled a constant temperature of 120° C. for 16 hours. The aluminum foil was cooled at 21° C. The results are listed in table 5.

TABLE 5

Performance data of molded articles using in-reactor polymer blends produced in Examples 9~12

| Example # | Sk#6 | Sk#7 | Sk#8 | Sk#9 |
|---|---|---|---|---|
| Polymer # | 9 | 10 | 11 | 12 |
| Neat polymer (wt %) | 97.7 | 97.7 | 97.7 | 97.7 |
| Irganox B225 (wt %) | 0.3 | 0.3 | 0.3 | 0.3 |
| Carbon MB (wt %) | 2 | 2 | 2 | 2 |
| Shore hardness | 52D | 50D | 49D | 62D |
| Scratch at 5N (delta L) | 1.07 | 1.05 | 0.96 | 0.82 |
| Scratch resistance rating (Taber scratch) | | | | 3 |
| Fogging @ 120° C. (mg) | 0.21 | 0.14 | 0.16 | |
| Tensile strength (MPa) | 17.5 | 15.5 | 14.1 | 23.4 |
| Elongation at break (%) | 118 | 217 | 120 | 725 |
| Modulus at 100% of strain (MPa) | 11.1 | 10.3 | 9.7 | 15.3 |
| E-modulus (MPa) | 268 | 218 | 195 | 640 |
| Tear strength (kN/m) | 41 | 77 | 69 | 69 |
| Gloss change after aging at 80° C. for 788 hours (measured after 1 hour of relaxation) | 0.1 | 0.2 | 0.3 | |
| Gloss change after aging at 100° C. for 620 hours (measured after 1 hour of relaxation) | 3.7 | 4.25 | 4.55 | |

TABLE 6

Gloss values for samples aged at various temperatures and time durations (measured at immediately after heat aging)

| Aging time (hr) | Sk#1 | Sk#2 | Sk#3 | Sk#4 | Sk#5 | Sk#6 | Sk#7 | Sk#8 |
|---|---|---|---|---|---|---|---|---|
| | | | | Gloss value | | | | |
| Aging temperature = 80° C. | | | | | | | | |
| 0 | 1.3 | 1.3 | 1.3 | 1.3 | 1.3 | 1.3 | 1.3 | 1.3 |
| 2 | 1.8 | 1.7 | 1.2 | 1.3 | 1.9 | 1.2 | 1.3 | 1.3 |
| 24 | 3 | 2.7 | 1.25 | 1.3 | 3.35 | 1.3 | 1.3 | 1.4 |
| 168 | 5.05 | 4.3 | 1.25 | 1.3 | 5.7 | 1.3 | 1.4 | 1.5 |
| 788 | 6.65 | 5.2 | 1.3 | 1.25 | 7.1 | 1.3 | 1.4 | 1.5 |
| Aging temperature = 90° C. | | | | | | | | |
| 0 | 1.3 | 1.3 | 1.3 | 1.3 | 1.3 | 1.3 | 1.3 | 1.3 |
| 2 | 2.1 | 1.9 | 1.3 | 1.3 | 2.05 | 1.3 | 1.3 | 1.4 |
| 24 | 4.3 | 3.5 | 1.4 | 1.35 | 4.8 | 1.45 | 1.55 | 1.65 |
| 168 | 6.6 | 5.45 | 1.5 | 1.35 | 6.8 | 1.65 | 1.8 | 2 |
| 500 | 7.3 | 6.3 | 1.5 | 1.3 | 7.7 | 1.8 | 2.1 | 2.45 |
| Aging temperature = 100° C. | | | | | | | | |
| 0 | 1.3 | 1.3 | 1.3 | 1.3 | 1.3 | 1.3 | 1.3 | 1.3 |
| 2 | 3.2 | 2.55 | 1.45 | 1.4 | 3.4 | 1.6 | 1.8 | 1.8 |
| 24 | 6.5 | 5.6 | 1.6 | 1.4 | 6.9 | 2.05 | 2.5 | 2.7 |
| 168 | 8.55 | 7.55 | 1.8 | 1.4 | 9.25 | 3.4 | 3.7 | 4.1 |
| 788 | 13 | 9.55 | 2.1 | 1.4 | 16.1 | 4.9 | 5.35 | 5.75 |
| Aging temperature = 110° C. | | | | | | | | |
| 0 | 1.3 | 1.3 | 1.3 | 1.3 | 1.3 | 1.3 | 1.3 | 1.3 |
| 2 | 4.55 | 3.65 | 1.75 | 1.45 | 5 | 2.1 | 2.35 | 2.3 |
| 24 | 7.05 | 6 | 2.65 | 1.45 | 7.3 | 3.9 | 4.1 | 4.55 |
| 168 | | | 4.35 | 1.45 | | 5.65 | 5.45 | |
| 500 | | | | 1.4 | | | | |
| Aging temperature = 120° C. | | | | | | | | |
| 0 | 1.3 | 1.3 | 1.3 | 1.3 | 1.3 | 1.3 | 1.3 | 1.3 |
| 2 | 7.65 | 5.65 | 2.25 | 1.6 | 8.2 | 3.4 | 3.9 | 3.25 |
| 24 | 11 | 8.55 | 5.4 | 1.9 | 13.1 | 6.7 | 7.25 | 6.7 |
| 168 | | | | 2.3 | | | | |
| 500 | | | | 2.65 | | | | |

TABLE 7

Gloss value for samples heat aged at various
temperatures and after 1 hr. of relaxation

| Aging time (hr) | Sk#1 | Sk#2 | Sk#3 | Sk#4 | Sk#5 | Sk#6 | Sk#7 | Sk#8 |
|---|---|---|---|---|---|---|---|---|
| | | | | Gloss value | | | | |
| Aging temperature = 80° C. | | | | | | | | |
| 0 | 1.3 | 1.4 | 1.3 | 1.3 | 1.4 | 1.2 | 1.2 | 1.2 |
| 2 | 1.8 | 1.7 | 1.2 | 1.3 | 1.9 | 1.25 | 1.3 | 1.3 |
| 24 | 2.75 | 2.5 | 1.2 | 1.3 | 3.3 | 1.3 | 1.3 | 1.4 |
| 168 | 4.95 | 4.15 | 1.25 | 1.3 | 5.6 | 1.3 | 1.4 | 1.5 |
| 788 | 5.9 | 4.75 | 1.25 | 1.3 | 6.65 | 1.3 | 1.4 | 1.5 |
| Aging temperature = 90° C. | | | | | | | | |
| 0 | 1.3 | 1.4 | 1.3 | 1.3 | 1.4 | 1.2 | 1.2 | 1.2 |
| 2 | 2 | 1.8 | 1.3 | 1.3 | 2.05 | 1.3 | 1.3 | 1.35 |
| 24 | 4.1 | 3.4 | 1.4 | 1.35 | 4.55 | 1.45 | 1.6 | 1.7 |
| 168 | 6 | 5.15 | 1.4 | 1.3 | 6.6 | 1.65 | 1.85 | 2.05 |
| 500 | 7.05 | 5.95 | 1.5 | 1.3 | 7.4 | 1.75 | 2.1 | 2.4 |
| Aging temperature = 100° C. | | | | | | | | |
| 0 | 1.3 | 1.4 | 1.3 | 1.3 | 1.4 | 1.2 | 1.2 | 1.2 |
| 2 | 3.1 | 2.45 | 1.45 | 1.4 | 3.3 | 1.6 | 1.8 | 1.8 |
| 24 | 6.3 | 5.35 | 1.6 | 1.4 | 6.55 | 2.1 | 2.5 | 2.8 |
| 168 | 7.75 | 7.15 | 1.8 | 1.4 | 8.95 | 3.2 | 3.65 | 4.05 |
| 620 | 11.95 | 9.15 | 2.1 | 1.4 | 14.55 | 4.9 | 5.45 | 5.75 |
| Aging temperature = 110° C. | | | | | | | | |
| 0 | 1.3 | 1.4 | 1.3 | 1.3 | 1.4 | 1.2 | 1.2 | 1.2 |
| 2 | 4.45 | 3.45 | 1.65 | 1.45 | 4.8 | 2.05 | 2.2 | 2.3 |
| 24 | 6.9 | 5.4 | 2.5 | 1.5 | 7.3 | 4.05 | 4.15 | 4.55 |
| 168 | 9.45 | 7.65 | 4.2 | 1.4 | 10.95 | 5.2 | 5.15 | 5.75 |
| 500 | 17.55 | 10.2 | 4.55 | 1.4 | 25.95 | 5.95 | 5.9 | 6.7 |
| Aging temperature = 120° C. | | | | | | | | |
| 0 | 1.3 | 1.4 | 1.3 | 1.3 | 1.4 | 1.2 | 1.2 | 1.2 |
| 2 | 7.3 | 5.25 | 2.25 | 1.65 | 7.95 | 3.3 | 3.9 | 3.3 |
| 24 | 10.2 | 7.65 | 5.1 | 1.9 | 12.15 | 6.35 | 6.95 | 6.55 |
| 168 | 21.85 | 14.1 | 6 | 2.4 | 25.35 | 8.25 | 9.3 | 8.65 |
| 500 | 48.55 | 27.45 | 8.45 | 2.65 | 53.5 | 12.55 | 12.85 | 11.6 |

Stickiness of the injection molded plaques using materials produced in Example 4~11 was determined using direct touch method described earlier. The measurement was conducted on K09 grained plaque. The molded articles were heat aged at temperatures of 80, 90, 100, 110 and 120° C. for a time period ranging from 2 hours to 788 hours. The heat aged samples were taken out of the oven at the end of aging period and placed on a flat surface and the stickiness test was done as quickly as possible to avoid sample cooling effects on stickiness. Stickiness ratings are listed in Table 8.

The inventive in-reactor polymer blends provide for excellent scratch resistance and non-sticky surface after heat aging of molded articles.

TABLE 8

Surface stickiness rating for heat aged
samples after 1 hr. of relaxation

| Aging time (hr) | Sk#1 | Sk#2 | Sk#3 | Sk#4 | Sk#5 | Sk#6 | Sk#7 | Sk#8 |
|---|---|---|---|---|---|---|---|---|
| | | | Surface stickiness rating after heat aging | | | | | |
| Aging temperature = 80° C. | | | | | | | | |
| 0 | 1 | 1 | 1 | 1 | 1 | 1 | 1 | 1 |
| 2 | 3 | 3 | 2 | 2 | 3 | 2 | 2 | 2 |
| 24 | 3 | 4 | 2 | 2 | 3 | 2 | 2 | 2 |
| 168 | 3 | 4 | 2 | 2 | 4 | 2 | 2 | 2 |
| 788 | 4 | 4 | 2 | 2 | 4 | 2 | 2 | 2 |
| Aging temperature = 90° C. | | | | | | | | |
| 0 | 1 | 1 | 1 | 1 | 1 | 1 | 1 | 1 |
| 2 | 1 | 1 | 1 | 1 | 2 | 1 | 1 | 1 |
| 24 | 3 | 3 | 1 | 1 | 2 | 1 | 1 | 1 |
| 168 | 3 | 3 | 2 | 2 | 3 | 2 | 2 | 2 |
| 500 | 3 | 3 | 2 | 2 | 3 | 2 | 2 | 2 |
| Aging temperature = 100° C. | | | | | | | | |
| 0 | 1 | 1 | 1 | 1 | 1 | 1 | 1 | 1 |
| 2 | 3 | 3 | 3 | 2 | 3 | 3 | 3 | 3 |
| 24 | 4 | 4 | 3 | 2 | 3 | 2 | 2 | 2 |
| 168 | 2 | 2 | 1 | 1 | 2 | 2 | 2 | 2 |
| 788 | 4 | 4 | 2 | 2 | 4 | 3 | 3 | 3 |
| Aging temperature = 110° C. | | | | | | | | |
| 0 | 1 | 1 | 1 | 1 | 1 | 1 | 1 | 1 |
| 2 | 3 | 3 | 1 | 1 | 3 | 2 | 2 | 2 |
| 24 | 3 | 3 | 2 | 2 | 3 | 3 | 3 | 3 |
| 168 | 3 | 3 | 3 | 2 | 3 | 3 | 3 | 3 |
| 500 | 4 | 4 | 4 | 1 | 4 | 4 | 4 | 4 |
| Aging temperature = 120° C. | | | | | | | | |
| 0 | 1 | 1 | 1 | 1 | 1 | 1 | 1 | 1 |
| 2 | 3 | 3 | 2 | 2 | 3 | 2 | 2 | 2 |
| 24 | 3 | 3 | 3 | 2 | 3 | 2 | 2 | 2 |
| 168 | 2 | 2 | 2 | 1 | 2 | 2 | 2 | 2 |
| 500 | 2 | 2 | 2 | 1 | 2 | 2 | 2 | 2 |

EXAMPLES 13 TO 16

Comparative

A series of physical blends of polypropylene and propylene/ethylene copolymers were produced. The polymers for the physical blends were chosen to be approximate replicas of the components of the in-reactor blends of Examples 1 to 3. The weight proportion of the components in the physical blends is similar to that of the in-reactor produced polymer blends. Two homo-polypropylene samples and two propylene/ethylene copolymer samples were made using a similar polymerization procedure described in Examples 1 to 3 except that a single catalyst system was used in a single polymerization reactor. The polymerization was carried out at the same reaction temperature and similar monomer concentration with the same catalyst system to ensure that the physical blend had the same component characteristics as the in-reactor blends. The properties of these polymers are listed in Table 9.

TABLE 9

Molecular weight and composition of
materials for physical blending

| Polymer No. | EP1 | EP2 | PP1 | PP2 |
|---|---|---|---|---|
| Mn_DRI (kg/mol) | 25.1 | 22.1 | 35.2 | 55.9 |
| Mw_DRI (kg/mol) | 75.6 | 54.4 | 81.6 | 137.1 |
| Mz_DRI (kg/mol) | 144.5 | 97.7 | 145.1 | 258.7 |
| g'vis | 0.8 | 0.8 | 0.9 | 0.9 |
| Tc (° C.) | 68.3 | 43.6 | 109.8 | 111.1 |
| Tm (° C.) | 111.4 | 81.4 | 150.8 | 153.4 |
| Tg (° C.) | −13.4 | | | |

TABLE 9-continued

Molecular weight and composition of
materials for physical blending

| Polymer No. | EP1 | EP2 | PP1 | PP2 |
|---|---|---|---|---|
| Heat of fusion (J/g) | 60.3 | 34.2 | 106.7 | 107.1 |
| Ethylene content (wt %) | 4.7 | 11.47 | 0 | 0 |
| Brook field viscosity @ 190° C. (mPa · s) | | | 12350 | 77500 |

The comparative physical blends were made by blending preformed polymer components of the similar composition and molecular weight as in the in-reactor blends in a Brabender (Available from C. W. Brabender Instrument, Inc., South Hackensack, N.J.). The samples were first mixed in a Brabender melt mixer with ~45 mL mixing head. The polymer was stabilized with IRGANOX B 225 antioxidant (available from Ciba Corporation, Tarrytown, N.Y.) during mixing in the Brabender. The Brabender was operated at 60 rpm and at temperature of 230° C. Mixing time at temperature was about 5 minutes, after which the sample was removed from the mixing chamber. The homogenized samples were molded under compression into plaques on a Carver hydraulic press for analysis.

The blend in Example PP1/EP1 was too brittle and broke during tensile test. The specimen in Example PP1/EP1 and PP2/EP1 broke when the crystal structures in polypropylene phase break down so their elongations at break are less than 15%. Blend of PP2/EP2 had an elongation at break of 285% (still significantly lower than the elongation of the inventive polymer blend); however the stress is rapidly reduced from the peak stress of 21.5 MPa at the yield point to 13.8 MPa at 100% of elongation. No strain hardening was observed. The data of tensile properties for the physical blends are listed in Table 10. The toughness, as measured by the area under the strain-stress curve, for these physical blends of is much less than that of the invented products. The Strain-Stress curve for blends of PP2/EP1 and PP2/EP2 are shown in FIG. 2.

TABLE 10

| Example # | PP1/EP1 | PP1/EP2 | PP2/EP1 | PP2/EP2 |
|---|---|---|---|---|
| PP1 (wt. %) | 49.85 | 49.85 | 0 | 0 |
| PP2 (wt. %) | 0 | 0 | 49.85 | 49.85 |
| EP1 (wt. %) | 49.85 | 0 | 49.85 | 0 |
| EP2 (wt. %) | 0 | 49.85 | 0 | 49.85 |
| B225 (wt. %) | 0.3 | 0.3 | 0.3 | 0.3 |
| Tc (° C.) | 106.2 | 113.9 | 108.8 | 108.2 |
| Tm (° C.) | 155.3 | 151.4 | 157.5 | 157.4 |
| Tg (° C.) | −15.9 | −26.7 | | −24.3 |
| Heat of fusion (J/g) | 78.9 | 48.5 | 79.9 | 50.4 |
| Tm from a secondary peak (° C.) | 115.1 | | 119 | |
| Elongation at break (%) | | 12.9 | 6.4 | 285 |
| Tensile strength (MPa) | | 19.8 | 21.8 | 21.5 |
| Modulus at 100% of strain (MPa) | | | | 13.8 |
| Toughness (mega joule/m$^3$) | | 1.52 | 0.6 | 42.12 |

For purposes of the claims, when both an ISO and ASTM test method have been cited herein, the ASTM method shall be used.

All documents described herein are incorporated by reference herein, including any priority documents and/or testing procedures to the extent they are not inconsistent with this text, provided however that for US purposes any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A molded article comprising an in-reactor polymer blend comprising: (a) a first propylene polymer comprising 90 to 100 wt % propylene and from 0 to less than 10 wt % comonomer, said first propylene component having a Tm of 135° C. or more; and (b) a second propylene polymer comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer, wherein the polymer blend has:
   (a) a Tm of at least 135° C.,
   (b) a melt flow rate of at least 70 dg/min,
   (c) a tensile strength of at least 8 MPa,
   (d) an elongation at break of at least 200%,
   (e) a tensile strength at break of 10 MPa or more, and
   (f) a GME 60280 scratch resistance of less than 1.2 DL at a scratching load of 5 N.

2. The molded article of claim 1 wherein the molded article has a tear strength of 30kN/m or more.

3. The molded article of claim 1 wherein the molded article has a GME 60280 scratch resistance of less than 1.0 DL at a scratching load of 5 N.

4. The molded article of claim 1 wherein the molded article has a volatile constituent of 4 mg or less as determined according to DIN 75201B.

5. The molded article of claim 1 wherein the molded article has a strain hardening ratio M300/M100 greater than 1.

6. The molded article of claim 1 wherein the molded article has a strain hardening ratio M500/M100 greater than 1.03.

7. The molded article of claim 1 wherein the molded article has a strain hardening ratio Mx/M100 greater than 1.2, where Mx is the tensile strength at break.

8. The molded article of claim 1 wherein the polymer blends has 0.01 branches or more per 1000 carbon atoms.

9. The molded article of claim 1 where the surface gloss change on a K09 grained surface of the molded article after heat aging for 168 hours at 110° C. is less than 10.0, as determined in accordance with ISO 2813 at an angle of 60°.

10. The molded article of claim 1 where the surface gloss change on a K09 grained plaque of the molded article after heat aging for 168 hours at 80° C. is less than 5, as determined in accordance with ISO 2813 at an angle of 60.

11. The molded article of claim 1 wherein the first propylene containing polymer has 92 to 99 wt % propylene and 1 to 8 wt % comonomer selected from the group consisting of ethylene, butene, hexene or octene.

12. The molded article of claim 1 wherein the second propylene containing polymer has 35 to 85 wt % propylene and 65 to 15 wt % comonomer selected from the group consisting of ethylene, butene, hexene or octene.

13. The molded article of claim 1 wherein the first propylene containing polymer has a melting point of 140° C. or more, and the second propylene containing polymer has an Mw of 50,000g/mol or more.

14. The molded article of claim 1 wherein the first propylene containing polymer has a melting point of 14020 C. or more, and the second propylene containing polymer has an Mw of 50,000 g/mol or more and has an mm triad tacticity index of 75% or less and an Hf of 10 to 70 J/g.

15. The molded article of claim 1 wherein the first propylene containing polymer has a melting point of 145° C. or more, and the second propylene containing polymer has an Mw of 75,000 g/mol or more and has an mm triad tacticity index of 50% or less and an Hf of 50J/g or less.

16. The molded article of claim 1 wherein the polymer blend has an Mw of 20,000 to 200,000 g/mol.

17. The molded article of claim 1 wherein the polymer blend has a cyclohexane refluxing insoluble fraction of 70 wt % or less.

18. The molded article of claim 1 wherein the molded article has less than 1 wt % of oil, and less than 1 wt % of plasticizer.

19. The molded article of claim 1 wherein the molded article comprises 90 wt % or more of the in-reactor polymer blend and 10 wt % or less of additives.

20. An automobile part comprising a molded article, the molded article comprising an in-reactor polymer blend comprising: (a) a first propylene polymer comprising 90 to 100 wt % propylene and from 0 to less than 10 wt % comonomer, said first propylene component having a Tm of 135° C. or more; and (b) a second propylene polymer comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer, wherein the polymer blend has:

(a) a Tm of at least 135° C.,
(b) a melt flow rate of at least 70 dg/min,
(c) a tensile strength of at least 8 MPa,
(d) an elongation at break of at least 200%,
(e) a tensile strength at break of 10 MPa or more, and
(f) a GME 60280 scratch resistance of less than 1.2 DL at a scratching load of 5 N.

21. The molded article of claim 1 wherein the molded article has a Shore hardness of 15A to 90D.

22. The molded article of claim 1 wherein the molded article has a heat of fusion of 70 J/g or less.

23. The molded article of claim 1 wherein the molded article has an M800/M100 strain hardening ratio greater than 1.0.

24. The molded article of claim 1 wherein the molded article has a toughness of 50 megajoule/m$^3$.

25. The molded article of claim 1 wherein the molded article has a ductile failure in a multi-axial impact strength test at 230° C.

26. The molded article of claim 1 wherein the molded article has a heat distortion temperature of 60° C. or more measured at 1.8 MPa.

27. The molded article of claim 1 wherein the molded article has volatile constituents of less than 4 mg.

28. The molded article of claim 1 wherein the molded article has a shrinkage upon injection molding of 0.1 to 5%.

29. The molded article of claim 1 wherein the in reactor blend has a complex viscosity of 4000 Pa·s or less.

* * * * *